(12) United States Patent
Khandekar et al.

(10) Patent No.: US 8,693,444 B2
(45) Date of Patent: *Apr. 8, 2014

(54) CONTROL RESOURCE MAPPING FOR A WIRELESS COMMUNICATION SYSTEM

(75) Inventors: Aamod Khandekar, San Diego, CA (US); Alexei Gorokhov, San Diego, CA (US); Naga Bhushan, San Diego, CA (US); Sandip Sarkar, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,943

(22) Filed: May 7, 2012

(65) Prior Publication Data

US 2012/0218943 A1   Aug. 30, 2012

Related U.S. Application Data

(62) Division of application No. 11/968,642, filed on Jan. 2, 2008.

(60) Provisional application No. 60/883,387, filed on Jan. 4, 2007, provisional application No. 60/883,758, filed on Jan. 5, 2007.

(51) Int. Cl.

| | |
|---|---|
| *H04B 7/216* | (2006.01) |
| *H04W 72/04* | (2009.01) |
| *H04B 1/713* | (2011.01) |
| *H04W 72/08* | (2009.01) |
| *H04L 5/00* | (2006.01) |
| *H04B 7/26* | (2006.01) |

(52) U.S. Cl.
CPC .............. *H04W 72/04* (2013.01); *H04W 72/08* (2013.01); *H04L 5/0053* (2013.01); *H04B 1/713* (2013.01); *H04B 7/2621* (2013.01)
USPC ............ 370/335; 370/330; 370/342; 370/343

(58) Field of Classification Search
None
See application file for complete search history.

(56) References Cited

U.S. PATENT DOCUMENTS

| | | | |
|---|---|---|---|
| 4,926,416 | A | 5/1990 | Weik |
| 5,864,577 | A | 1/1999 | Ramel |

(Continued)

FOREIGN PATENT DOCUMENTS

| | | |
|---|---|---|
| CA | 2605556 A1 | 12/2006 |
| EP | 0650304 A2 | 4/1995 |

(Continued)

OTHER PUBLICATIONS

3GPP2 C.S0084-002, Version 2, "Medium Access Control Layer for Ultra Mobile Broadband (UMB) Air Interface Specification," Aug. 2007.

(Continued)

*Primary Examiner* — Ian N Moore
*Assistant Examiner* — Jackie Zuniga Abad
(74) *Attorney, Agent, or Firm* — S. Hossain Beladi

(57) ABSTRACT

Techniques for sending control information in a wireless communication system are described. A control segment may include $L \geq 1$ tiles, and each tile may include a number of transmission units. A number of control resources may be defined and mapped to the transmission units for the control segment. For symmetric mapping, multiple sets of $S \geq 1$ control resources may be formed, and each batch of L consecutive sets of S control resources may be mapped to S transmission units at the same location in the L tiles. For localized mapping, $S > 1$, and each set of S control resources may be mapped to a cluster of S adjacent transmission units in one tile. For distributed mapping, $S = 1$, and each control resource may be mapped to one transmission unit in one tile. For diversity, each control resource may be mapped to multiple (e.g., three) transmission units in at least one tile.

20 Claims, 13 Drawing Sheets

(56) References Cited

U.S. PATENT DOCUMENTS

| | | | |
|---|---|---|---|
| 5,896,357 | A | 4/1999 | Shinozaki et al. |
| 6,278,685 | B1 | 8/2001 | Yonge, III |
| 6,400,699 | B1 | 6/2002 | Airy et al. |
| 6,768,713 | B1 | 7/2004 | Siala et al. |
| 6,845,104 | B2 | 1/2005 | Johnson et al. |
| 6,928,066 | B1 | 8/2005 | Moon et al. |
| 7,242,722 | B2 | 7/2007 | Krauss et al. |
| 7,554,948 | B2 | 6/2009 | Naguib et al. |
| 2004/0062321 | A1 | 4/2004 | Nakamura et al. |
| 2005/0025039 | A1* | 2/2005 | Hwang et al. ............ 370/206 |
| 2005/0084000 | A1 | 4/2005 | Krauss et al. |
| 2005/0120097 | A1 | 6/2005 | Walton et al. |
| 2005/0135324 | A1 | 6/2005 | Kim et al. |
| 2005/0163194 | A1 | 7/2005 | Gore et al. |
| 2005/0165949 | A1 | 7/2005 | Teague |
| 2006/0062247 | A1* | 3/2006 | Li ............................ 370/465 |
| 2006/0109810 | A1 | 5/2006 | Au et al. |
| 2006/0209973 | A1 | 9/2006 | Gorokhov et al. |
| 2006/0274691 | A1 | 12/2006 | Naguib et al. |
| 2006/0285503 | A1 | 12/2006 | Mese et al. |
| 2007/0009054 | A1 | 1/2007 | Kwak et al. |
| 2008/0019314 | A1 | 1/2008 | Gorokhov et al. |
| 2008/0101441 | A1 | 5/2008 | Palanki et al. |
| 2008/0165969 | A1 | 7/2008 | Khandekar et al. |
| 2008/0166969 | A1 | 7/2008 | Gorokhov et al. |
| 2008/0167040 | A1 | 7/2008 | Khandekar et al. |
| 2008/0240159 | A1 | 10/2008 | Palanki et al. |
| 2009/0161772 | A1 | 6/2009 | Sawahashi et al. |
| 2009/0323642 | A1 | 12/2009 | Tanno et al. |
| 2013/0215760 | A1 | 8/2013 | Gorohkov et al. |

FOREIGN PATENT DOCUMENTS

| | | |
|---|---|---|
| EP | 0917305 A2 | 5/1999 |
| EP | 1289328 | 3/2003 |
| JP | 10502507 | 3/1998 |
| JP | 2005333677 A | 12/2005 |
| JP | 2006203355 A | 8/2006 |
| JP | 2006287757 A | 10/2006 |
| JP | 2006311465 A | 11/2006 |
| JP | 2007520169 A | 7/2007 |
| JP | 2008546316 A | 12/2008 |
| JP | 2008547252 A | 12/2008 |
| KR | 20000026410 A | 5/2000 |
| RU | 99126427 | 10/2001 |
| RU | 2187205 C2 | 8/2002 |
| RU | 2191477 | 10/2002 |
| RU | 2242091 C2 | 12/2004 |
| RU | 2250564 | 4/2005 |
| RU | 2257008 | 7/2005 |
| RU | 2282943 C2 | 8/2006 |
| WO | WO9852326 A2 | 11/1998 |
| WO | WO0013427 A2 | 3/2000 |
| WO | WO0101596 | 1/2001 |
| WO | WO0117125 A1 | 3/2001 |
| WO | WO0126269 | 4/2001 |
| WO | WO02058300 A1 | 7/2002 |
| WO | WO03001741 A1 | 1/2003 |
| WO | WO03032564 | 4/2003 |
| WO | WO2005046259 A2 | 5/2005 |
| WO | 2005074184 A2 | 8/2005 |
| WO | WO2005076552 | 8/2005 |
| WO | WO2006002658 A1 | 1/2006 |
| WO | WO2006007318 A1 | 1/2006 |
| WO | WO2006046894 A1 | 5/2006 |
| WO | WO2006094299 A1 | 9/2006 |
| WO | WO2006099546 A1 | 9/2006 |
| WO | WO2006099547 A1 | 9/2006 |
| WO | WO2006125150 A2 | 11/2006 |
| WO | 2006134829 A1 | 12/2006 |
| WO | WO2006130742 | 12/2006 |
| WO | WO2006133598 A1 | 12/2006 |
| WO | WO2006137708 | 12/2006 |
| WO | WO2007146930 | 12/2007 |
| WO | WO2008086244 | 7/2008 |

OTHER PUBLICATIONS 802.16e-2005 and IEEE Std 802.16/2004/Cor1-2005; Section 8.4.6.1.1 Preamble, Published 2006 IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1.

IEEE 802.11, IEEE Wireless LAN Edition, a Compilation Based on IEEE Std. 802.11-1999 (R2003) and its Amendments.

IEEE 802.16 IEEE Standard for Local and metropolitan area networks, Part 16: Air Interface for Fixed Broadband Wireless Access Systems, IEEE Std. 802.16-2004 (Revision of IEEE Std. 802.16-2001), Oct. 1, 2004.

IEEE Std. 802.20, 802.20/D0.2m, Jun. 2007, Draft Standard for Local and Metropolitan Area Networks—Standard Air Interface for Mobile Broadband Wireless Access Systems Supporting Vehicular Mobility—Physical and Media Access Control Layer Specification.

International Search Report—PCT/US08/050080—International Search Authority, European Patent Office, May 27, 2008.

International Search Report—PCT/US08/050179, International Search Authority—European Patent Office, Jun. 19, 2008.

International Search Report—PCT/US08/050328, International Search Authority—European Patent Office, Jun. 19, 2008.

International Search Report—PCT/US2008/050187—International Search Authority, European Patent Office, Jul. 29, 2008.

Taiwan Search Report—TW097100515—TIPO—Dec. 15, 2011.

Taiwan Search Report—TW097100516—TIPO—Jun. 3, 2011.

Taiwan Search Report—TW097100638—TIPO—Jun. 13, 2011.

TIA-1121.001 "Physical Layer for Ultra Mobile Broadband (UMB) Air Interface Specification," 3GPP2 C.S0084-001-0, Version 2.0 (Aug. 2007).

Translation of Office Action in Russian application 2009129959 corresponding to U.S. Appl. No. 11/968,631, citing WO2006046894A1, WO2006002658A1, RU99126427 and RU2187205 dated Mar. 21, 2011.

Written Opinion—PCT/US08/050080, International Search Authority, European Patent Office, May 27, 2008.

Written Opinion—PCT/US08/050179, International Search Authority—European Patent Office, Jun. 19, 2008.

Written Opinion—PCT/US08/050328, International Search Authority—European Patent Office, Jun. 19, 2008.

Written Opinion—PCT/US2008/050187—International Search Authority, European Patent Office, Jul. 29, 2008.

European Search Report—EP11009359—Search Authority—The Hague—Oct. 24, 2010.

Borran J., et al., "RL Traffic Power Control for LBC FDD", C30-20061030-076, 3GPP2, Oct. 2006, p. 1-15.

* cited by examiner

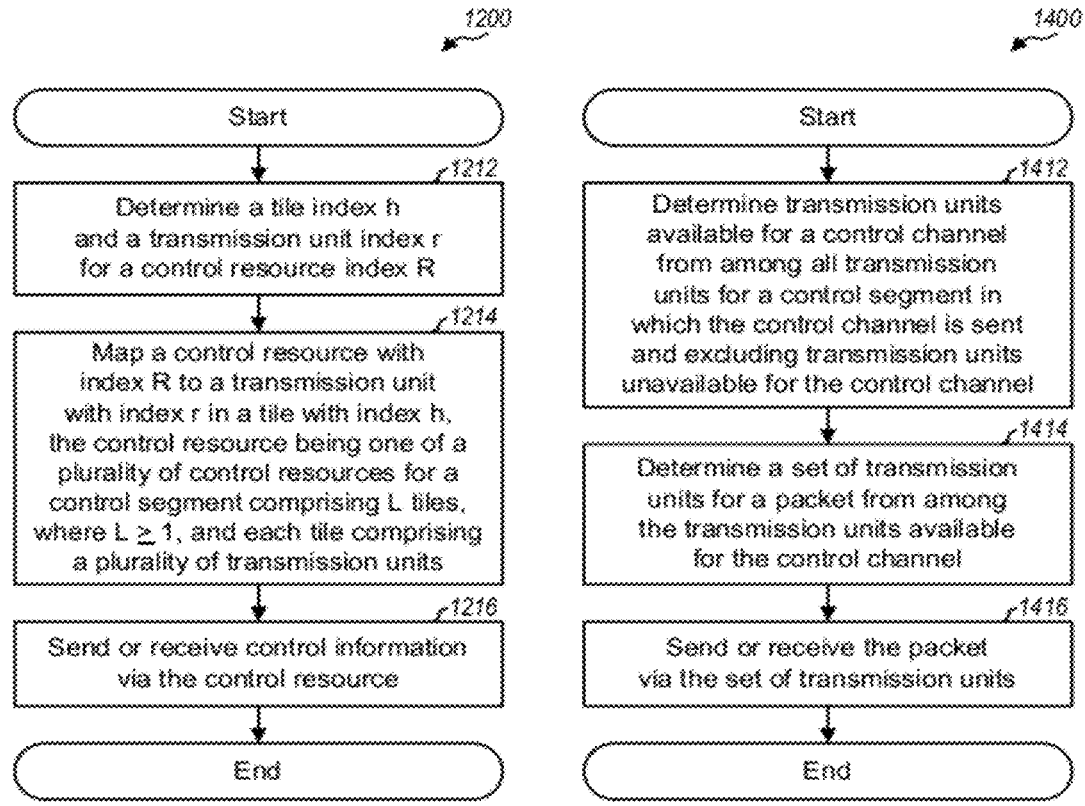
FIG. 12
FIG. 14
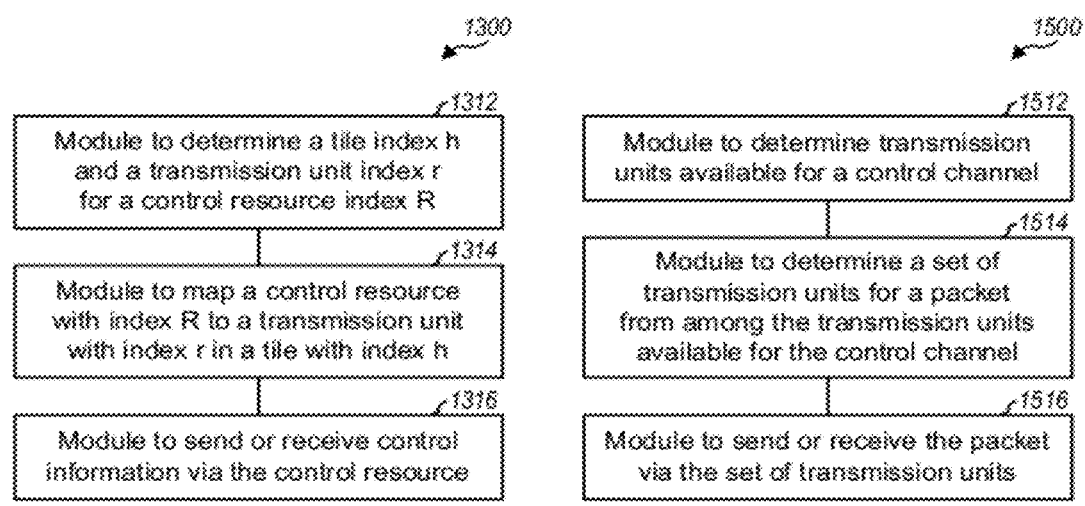
FIG. 13
FIG. 15

CONTROL RESOURCE MAPPING FOR A WIRELESS COMMUNICATION SYSTEM

The present application is a divisional of U.S. patent application Ser. No. 11/968,642, entitled "CONTROL RESOURCE MAPPING FOR A WIRELESS COMMUNICATION SYSTEM," inventors Aamod Khandekar et al., filed Jan. 2, 2008, which claims priority to provisional U.S. Application Ser. No. 60/883,387, entitled "METHOD AND APPARATUS FOR UTILIZING OTHER SECTOR INTERFERENCE (OSI) INDICATION," filed Jan. 4, 2007, and provisional U.S. Application Ser. No. 60/883,758, entitled "WIRELESS COMMUNICATION SYSTEM," filed Jan. 5, 2007, all assigned to the assignee hereof and incorporated herein by reference.

BACKGROUND

I. Field

The present disclosure relates generally to communication, and more specifically to techniques for sending control information in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include many base stations that can support communication for many terminals on the forward and reverse links. The forward link (or downlink) refers to the communication link from the base stations to the terminals, and the reverse link (or uplink) refers to the communication link from the terminals to the base stations. The system may utilize various control channels to support data transmission on the forward and reverse links. For example, a base station may transmit control information to assign resources to terminals, to acknowledge packets received from the terminals, to inform the terminals of operating conditions at the base station, etc. The control information sent by the base station, although beneficial, represent overhead in the system.

There is therefore a need in the art for techniques to efficiently send control information in a wireless communication system.

SUMMARY

Techniques for utilizing control resources to send control information in a wireless communication system are described herein. A control segment may be used to send different control channels and may include L tiles, where $L \geq 1$. Each tile may include a plurality of transmission units, and each transmission unit may correspond to (e.g., may be mapped to) one subcarrier in one symbol period. A plurality of control resources may be defined for the control segment and may be assigned to the control channels and used to send control information.

In one aspect, the plurality of control resources may be mapped to the transmission units for the control segment in a manner to achieve scalability for the control segment, diversity for each control resource, symmetric mapping of the plurality of control resources across the L tiles, localized mapping for sets of control resources, distributed mapping for consecutive control resources, or any combination of these features. In one design of symmetric mapping, multiple sets of S control resources may be formed for the plurality of control resources, where $S \geq 1$. Each batch of L consecutive sets of S control resources may be mapped to S transmission units at the same location in the L tiles. In one design of localized mapping, $S > 1$, and each set of S control resources may be mapped to a cluster of S adjacent transmission units in one tile. In one design of distributed mapping, $S = 1$, and consecutive control resources may be mapped to different tiles. In one mapping design that may be used for both localized and distributed mapping, the multiple sets of S control resources may be traversed, where $S \geq 1$, and each set of S control resources may be mapped to S transmission units in one tile determined by cycling through the L tiles. The first S control resources may map to tile 0, the next S control resources may map to tile 1, etc. A tradeoff between localization versus diversity may be obtained by choosing a proper value of S. In one design of diversity, each control resource may be mapped to multiple (e.g., three) transmission units in different locations of at least one tile to obtain diversity for the control resource.

In one design, a tile index h and a transmission unit index r for a control resource index R may be determined based on a mapping scheme. A control resource with index R may be mapped to a transmission unit with index r in a tile with index h. Control information may be sent or received via the control resource.

In another aspect, transmission units available for a given control channel may be determined from among all transmission units for a control segment and may exclude transmission units unavailable for the control channel (e.g., transmission units used for pilot, other control channels, and/or other transmissions). Multiple packets may be sent on the control channel in the control segment. Each packet may be mapped to a different set of transmission units, which may be distributed across the transmission units available for the control channel. In one design, the plurality of transmission units in each tile may be traversed, and each transmission unit may be assigned to one packet by cycling through the multiple packets. Each packet may be sent via its set of transmission units.

Various aspects and features of the disclosure are described in further detail below.

BRIEF DESCRIPTION OF THE DRAWINGS

FIG. 12 shows a process for communicating control information.
FIG. 13 shows an apparatus for communicating control information.

FIG. 14 shows a process for exchanging a control packet.

FIG. 15 shows an apparatus for exchanging a control packet.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved ULTRA (E-UTRA), IEEE 802.16, IEEE 802.20, Flash-OFDM®, etc. UTRA and E-UTRA are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMB, and UMB terminology is used in much of the description below. UMB is described in 3GPP2 C.S0084-001, entitled "Physical Layer for Ultra Mobile Broadband (UMB) Air Interface Specification," August 2007, which is publicly available.

Figure 1:
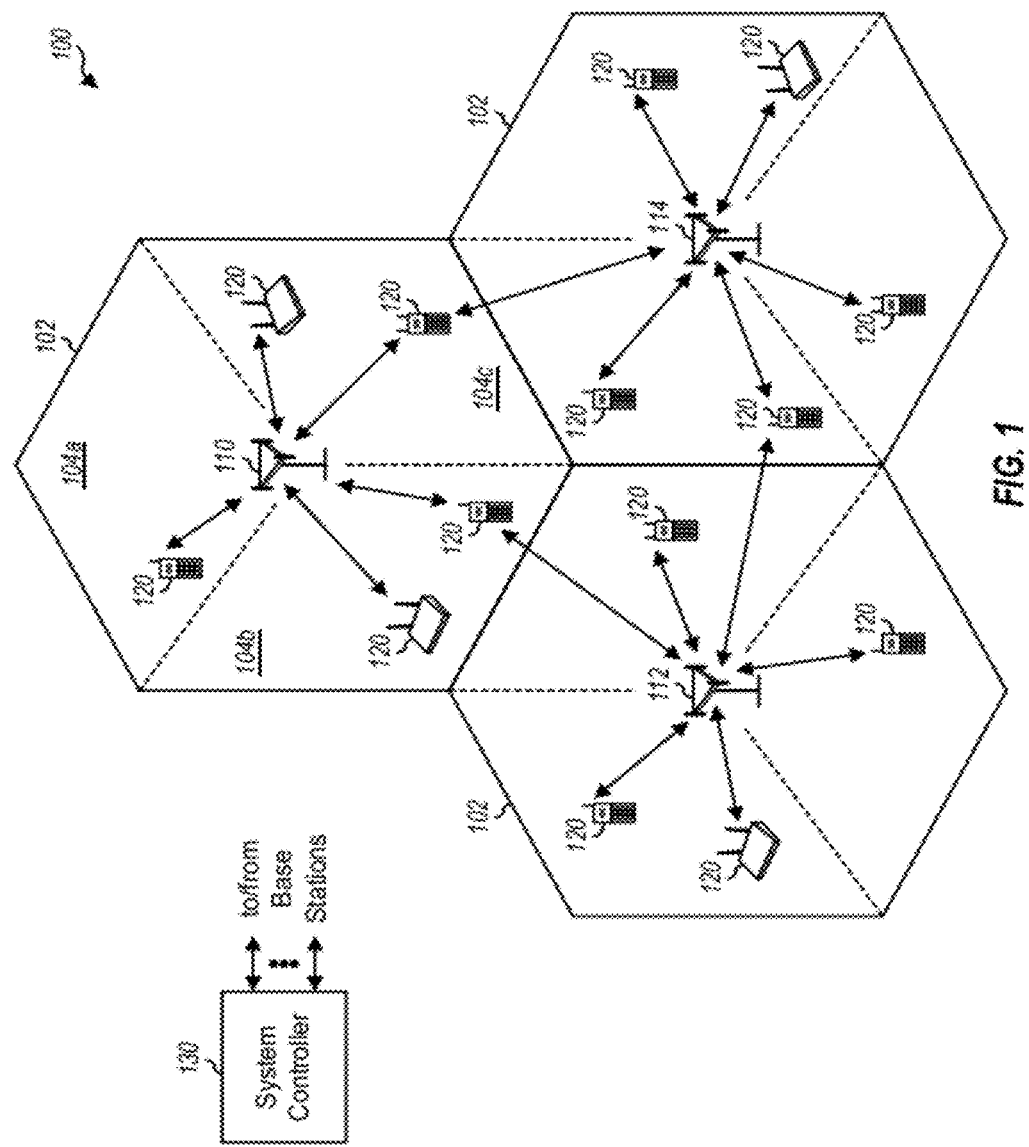
FIG. 1 shows a wireless communication system.

FIG. 1 shows a wireless communication system 100, which may also be referred to as an access network (AN). System 100 may include multiple base stations 110. A base station is a station that communicates with the terminals and may also be referred to as an access point, a Node B, an evolved Node B, etc. Each base station provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b and 104c. Each smaller area may be served by a respective base station subsystem. The term "sector" can refer to the smallest coverage area of a base station and/or a base station subsystem serving this coverage area.

Terminals 120 may be dispersed throughout the system, and each terminal may be stationary or mobile. A terminal may also be referred to as an access terminal (AT), a mobile station, a user equipment, a subscriber unit, a station, etc. A terminal may be a cellular phone, a personal digital assistant (PDA), a wireless communication device, a wireless modem, a handheld device, a laptop computer, a cordless phone, etc. A terminal may communicate with zero, one, or multiple base stations on the forward and/or reverse link at any given moment.

For a centralized architecture, a system controller 130 may couple to base stations 110 and provide coordination and control for these base stations. System controller 130 may be a single network entity or a collection of network entities. For a distributed architecture, the base stations may communicate with one another as needed.

Figure 2:
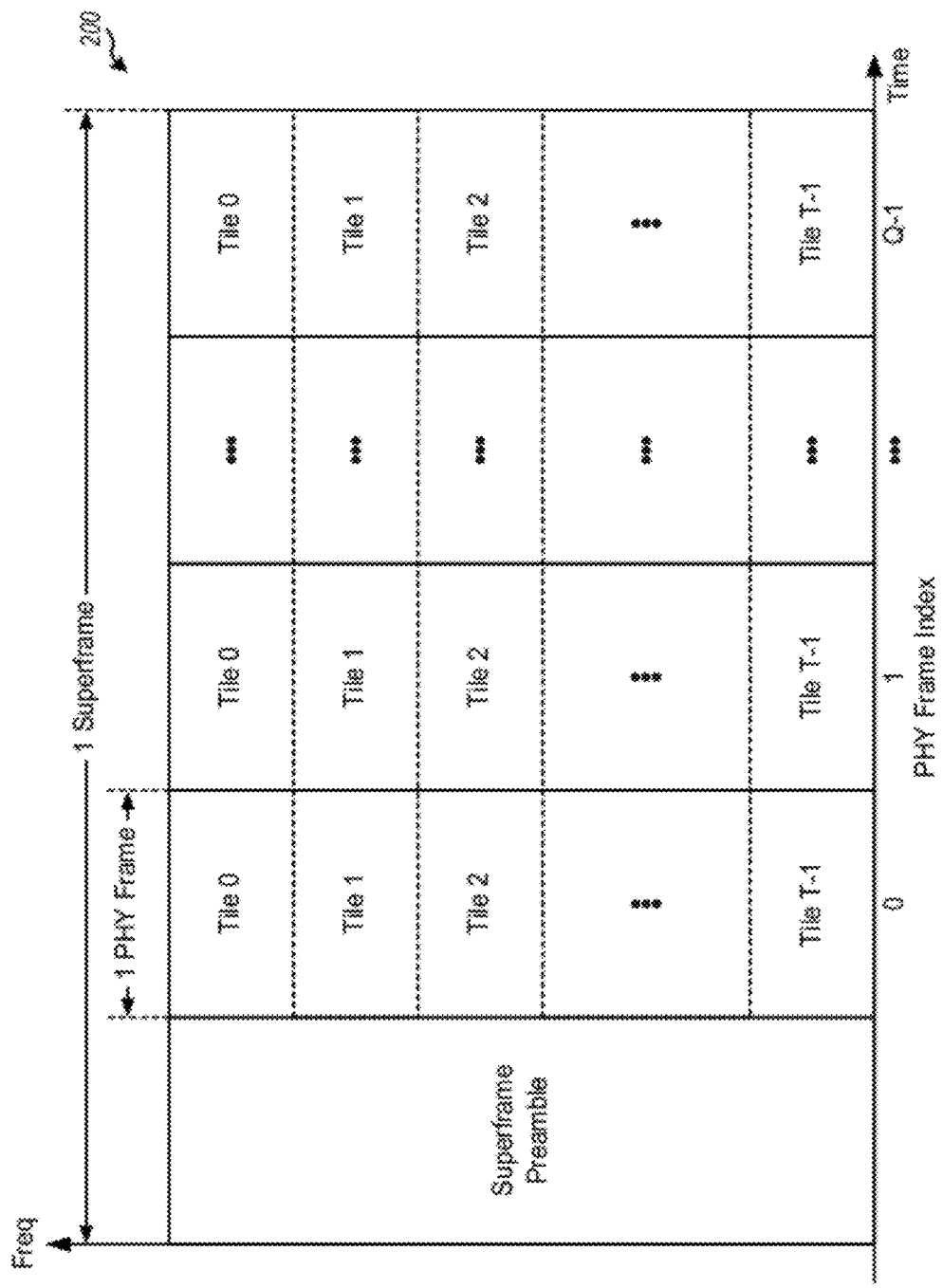
FIG. 2 shows a superframe structure.

FIG. 2 shows a design of a superframe structure 200 that may be used for the forward link. The transmission timeline may be partitioned into units of superframes. Each superframe may span a particular time duration, which may be fixed or configurable. Each superframe may include a preamble followed by Q physical layer (PHY) frames, where Q may be any integer value. In one design, each superframe includes 25 PHY frames with indices of 0 through 24. The superframe preamble may carry system information and acquisition pilots. Each PHY frame may carry traffic data, control information/signaling, pilot, etc.

The time frequency resources in each PHY frame may be partitioned into tiles. A tile may also be referred to as a time frequency block, a resource block, etc. A tile may cover a particular time and frequency dimension, which may be fixed or configurable. In one design, a tile includes physical resources, e.g., a block of subcarriers in one or more symbol periods. In another design, a tile includes logical resources that may be mapped to physical resources based on any mapping. In one design, the system bandwidth may be partitioned into multiple (K) orthogonal subcarriers with orthogonal frequency division multiplexing (OFDM). K hop-ports may be defined and may be mapped to the K subcarriers based on a known mapping. The tiles may be defined based on either subcarriers (which are physical resources) or hop-ports (which are logical resources).

Figure 3:
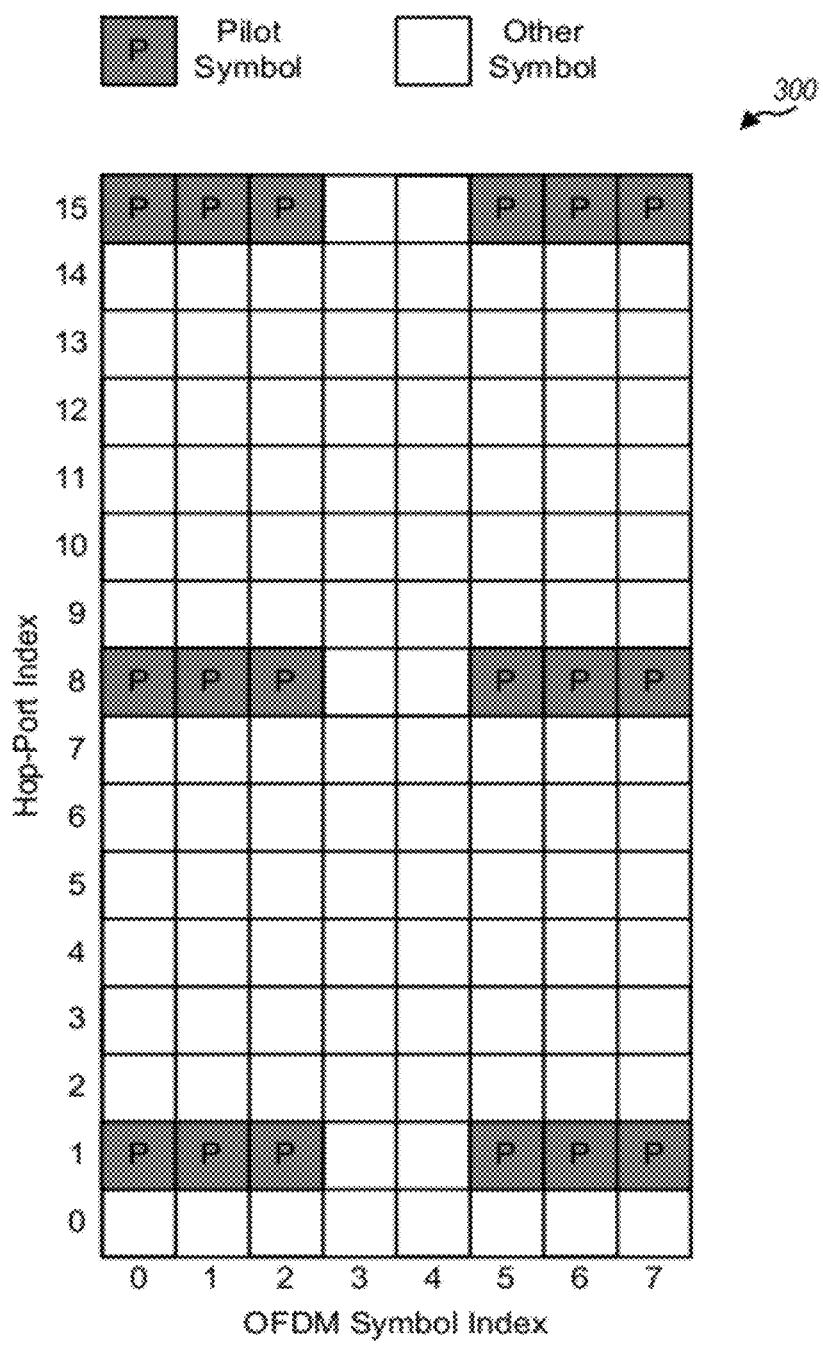
FIG. 3 shows a tile structure.

FIG. 3 shows a design of a tile 300. In this design, each PHY frame covers 8 OFDM symbol periods, and tile 300 covers 16 hop-ports in 8 OFDM symbol periods and includes 128 transmission units. The 16 hop-ports for the tile may be mapped to 16 contiguous subcarriers or to 16 subcarriers distributed across all or a large portion of the system bandwidth. A transmission unit may correspond to one subcarrier in one OFDM symbol period and may be used to send one symbol, which may be a real or complex value. A transmission unit may also be referred to as a subcarrier-symbol, a resource element, etc. Pilot symbols may be sent on some of the transmission units in the tile, and other symbols may be sent on the remaining transmission units in the tile. In the design shown in FIG. 3, the tile includes 18 transmission units for pilot symbols and 110 transmission units for other symbols.

Referring back to FIG. 2, each PHY frame may include T tiles with indices 0 through T−1, where T may be dependent on the system bandwidth. The 16 hop-ports in each tile may be mapped to contiguous subcarriers or to subcarriers distributed across the system bandwidth.

The system may utilize a set of control channels to send different types of control information on the forward link. Table 1 lists an example set of control channels and provides a short description of each control channel. These control channels are described in detail in the aforementioned 3GPP2 C.S0084-001.

TABLE 1

| Symbol | Channel | Description |
| --- | --- | --- |
| F-ACKCH | Forward Acknowledgment Channel | Carry acknowledgment (ACK) bits for packets received on the reverse link. |
| F-SPCH | Forward Start of Packet Channel | Carry start-of-packet indications to signal start of new packets and/or to control persistent resource assignments. |
| F-RABCH | Forward Reverse Activity Bit Channel | Carry indications of loading on CDMA subsegments on the reverse link. |

TABLE 1-continued

| Symbol | Channel | Description |
| --- | --- | --- |
| F-PQICH | Forward Pilot Quality Indicator Channel | Carry received pilot strength of reverse link pilots sent by terminals on the reverse link. |
| F-FOSICH | Forward Fast Other Sector Interference Channel | Carry indications of interference levels observed at a sector from terminals in other sectors. |
| F-IOTCH | Forward Interference over Thermal Channel | Carry indications of interference levels observed at a sector. |
| F-PCCH | Forward Power Control Channel | Carry power control commands to adjust transmit power of terminals. |
| F-SCCH | Forward Shared Control Channel | Carry access grants, resource assignments, and other control information related to resource management. |

In one design, the control channels may be sent in an FL control segment in each PHY frame. The FL control segment may include a sufficient amount of resources, e.g., a sufficient number of tiles, to carry the control information for all of the control channels.

Figure 4:
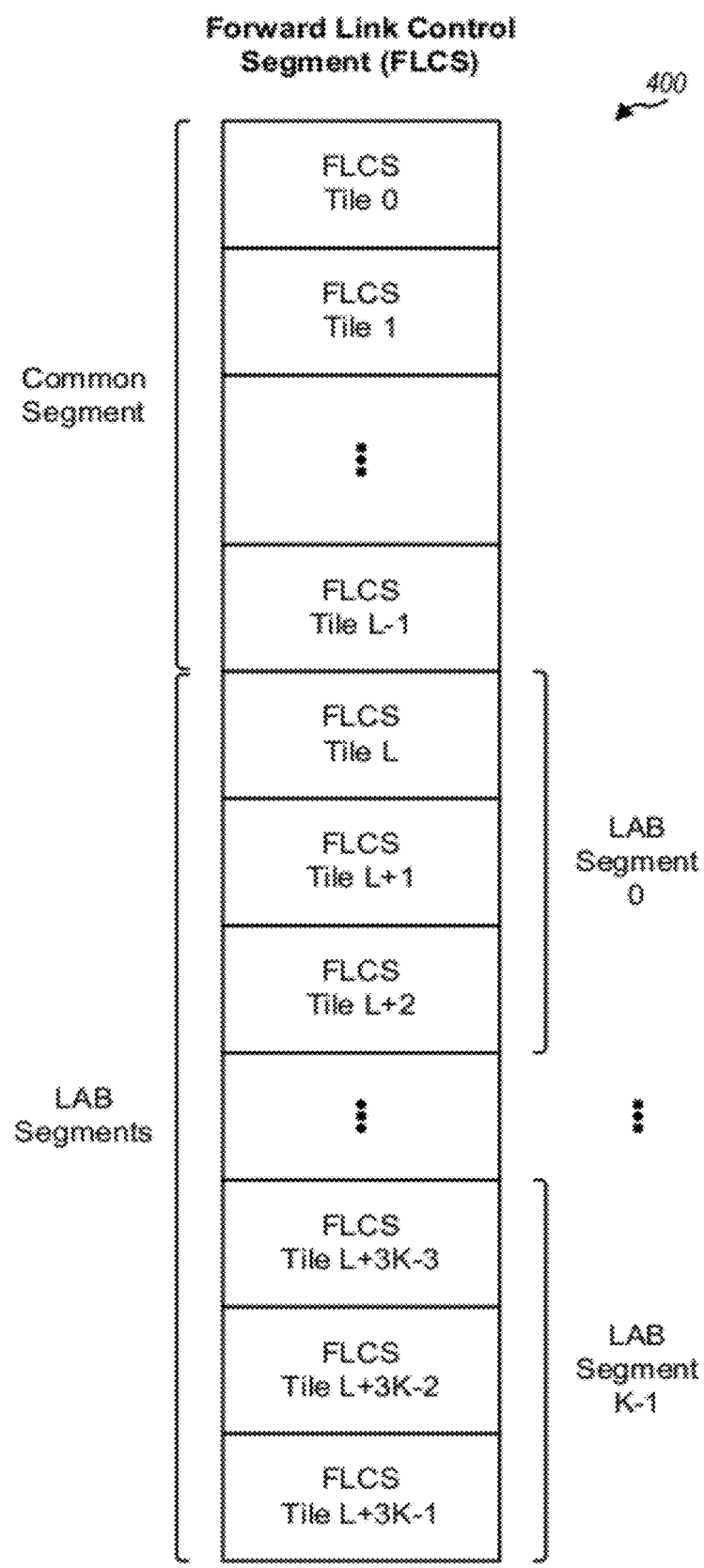
FIG. 4 shows a forward link (FL) control segment (FLCS).

FIG. 4 shows a design of an FL control segment 400. In this design, the FL control segment includes a common segment and zero or more (K) link assignment block (LAB) segments with indices of 0 through K−1. In the following description, the phrases "element with index x" and "element x" are used interchangeably, where element may refer to any quantity. The common segment may include L FLCS tiles with indices of 0 through L−1, where L≥1 and may be a configurable value. An FLCS tile is a tile used for the FL control segment. The K LAB segments may include 3·K FLCS tiles, with each LAB segment including three consecutive FLCS tiles, as shown in FIG. 4. The FL control segment may also be defined in other manners. In one design, the common segment carries all of the control channels in Table 1, possibly except for the F-SCCH. The F-SCCH may be sent in the K LAB segments if present or in the common segment otherwise.

In one design, the common segment may be partitioned into $N_{FLCS}$ FLCS resources, where $N_{FLCS}$ may be dependent on the number of FLCS tiles for the common segment and possibly other factors. The FLCS resources are logical resources that may simplify the allocation and use of the common segment. The FLCS resources may be mapped to transmission units in the common segment in various manners. The resource mapping may be such that the common segment can achieve one or more of the following:

Scalability—the mapping of FLCS resources to transmission units in the L FLCS tiles should scale readily regardless of the number of FLCS tiles, Diversity—each FLCS resource may be mapped to multiple transmission units to achieve diversity for the FLCS resource, Symmetric mapping—L consecutive sets of S FLCS resources may be mapped to the same location in L consecutive FLCS tiles before moving to another location of the FLCS tiles, where S≥1, Localized mapping—a set of multiple FLCS resources may be mapped to adjacent transmission units within an FLCS tile to observe similar channel response, Distributed mapping—consecutive FLCS resources may be mapped to different FLCS tiles to observe randomized channel response, and Forbidden zone—the FLCS resources may be mapped to available transmission units and to avoid unavailable transmission units in a forbidden zone.

The above features may be achieved as described below.

In one design, third order diversity may be obtained by mapping each FLCS resource to three transmission units in up to three different FLCS tiles. Other diversity orders (e.g., 2, 4, etc.) may also be obtained by mapping each FLCS resource to different numbers of transmission units. For clarity, much of the following description assumes FLCS resource mapping to obtain third order diversity.

In a first FLCS resource mapping scheme, the FLCS resources are mapped to transmission units in the common segment in a manner to achieve scalability, third order diversity, and localized mapping. The first FLCS resource mapping scheme may also be referred to as a Block Resource Channel (BRCII) mapping scheme.

For the first FLCS resource mapping scheme, each FLCS tile may be as shown in FIG. 3 and may include 110 transmission units that may be used to send control information. If the common segment includes L FLCS tiles as shown in FIG. 4, then the total number of FLCS resources for the common segment may be given as:

$$N_{FLCS} = \lfloor 110/3 \rfloor \times L = 36 \times L, \qquad \text{Eq (1)}$$

where "$\lfloor \ \rfloor$" denotes a floor operator. The $N_{FLCS}$ FLCS resources may be assigned indices of 0 through $N_{FLCS}-1$.

Figure 5:
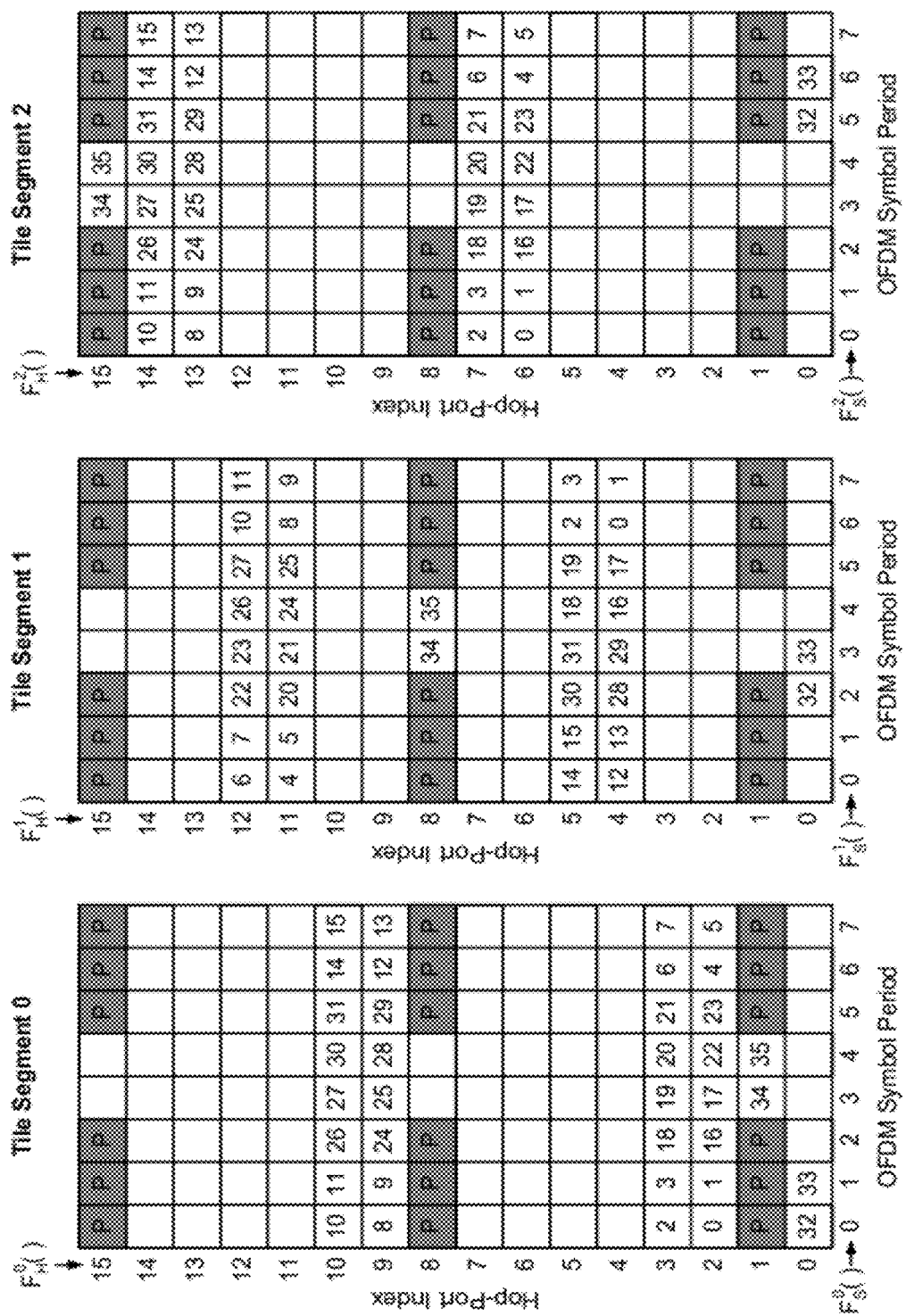
FIG. 5 shows three tile segments for an FLCS tile.

FIG. 5 shows a design of an FLCS tile that may be used to support third order diversity for the first FLCS resource mapping scheme. In this design, the FLCS tile is partitioned into three tile segments 0, 1 and 2. Each tile segment includes 36 transmission units to which FLCS resources may be mapped. The 36 transmission units in each tile segment may be assigned indices 0 through 35 based on a predetermined mapping. In the design shown in FIG. 5, transmission unit 0 in time segment 0 occupies hop-port 2 in OFDM symbol period 0, transmission unit 0 in time segment 1 occupies hop-port 4 in OFDM symbol period 6, and transmission unit 0 in tile segment 2 occupies hop-port 6 in OFDM symbol period 0. The other 35 transmission units in each time segment are shown in FIG. 5.

Figure 6:
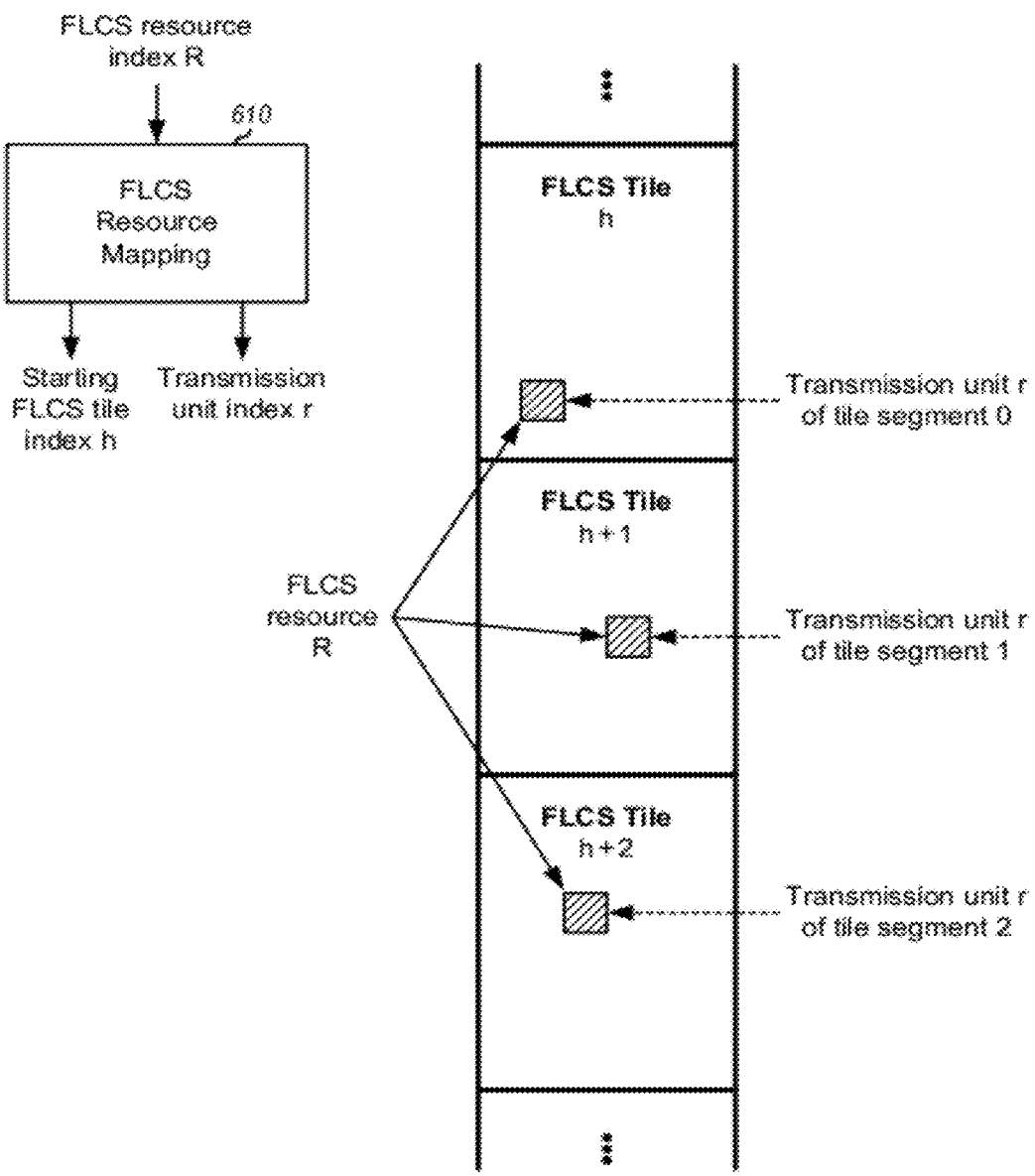
FIG. 6 shows mapping of an FLCS resource to three transmission units.

FIG. 6 shows mapping of an FLCS resource to three transmission units to achieve third order diversity for the first FLCS resource mapping scheme. In this design, an FLCS resource with index R is mapped to three transmission units with index r in all three tile segments 0, 1 and 2 of up to three consecutive FLCS tiles. A mapping unit 610 may receive the index R of the FLCS resource and may determine (i) an index h of the first FLCS tile for the FLCS resource and (ii) an index r of the transmission unit to which the FLCS resource is mapped. FLCS resource R may then be mapped to transmission unit r in tile segment 0 of FLCS tile h, transmission unit r in tile segment 1 of FLCS tile h+1, and transmission unit r in tile segment 2 of FLCS tile h+2. For clarity, FIG. 6 shows three consecutive FLCS tiles being used for FLCS resource R. The three FLCS tiles may also wrap around as described below.

In the design shown in FIG. 6, third order diversity is achieved by mapping the FLCS resource to three transmission units in three different FLCS tiles when L≥3. Furthermore, the FLCS resource is mapped to three different tile segments in the three FLCS tiles and thus occupies different time frequency locations in the three FLCS tiles. The FLCS resource may observe both frequency diversity (due to mapping to three different hop ports) and time diversity (due to mapping to different OFDM symbols).

The design shown in FIG. 6 can achieve third order diversity regardless of the number of FLCS tiles used for the common segment. If L=1, then the FLCS resource is mapped to three transmission units in three tile segments 0, 1 and 2 of one FLCS tile. If L=2, then the FLCS resource is mapped to three transmission units in tile segments 0 and 2 of one FLCS tile and in tile segment 1 of another FLCS tile. If L≥3, then the FLCS resource is mapped to three transmission units in tile segments 0, 1 and 2 of three FLCS tiles.

In one design, localized mapping may be achieved by mapping four consecutive FLCS resources to a 2×2 cluster of four transmission units. Referring back to FIG. 5, four consecutive FLCS resources may be mapped to four adjacent transmission units 0 through 3 in the three tile segments, the next four consecutive FLCS resources may be mapped to four adjacent transmission units 4 through 7 in the three tile segments, the next four consecutive FLCS resources may be mapped to four adjacent transmission units 8 through 11 in the three tile segments, etc. The wireless channel response may be assumed to be relatively static across each cluster of four transmission units. A value for a control channel may be sent in four consecutive FLCS resources and may then be mapped to a cluster of four adjacent transmission units in each tile segment. This value would then observe a relatively constant channel response for each cluster, which may improve demodulation performance. Transmission units 32 through 35 are in 1×2 clusters to make use of the remaining transmission units in the FLCS tile. Localized mapping may also be performed for other cluster sizes and shapes, e.g., 2×3 cluster, 3×3 cluster, etc.

For the first FLCS resource mapping scheme, FLCS resource R may be mapped to three transmission units according to the following procedure.

1. Define $h = \lfloor R/4 \rfloor \bmod L$. Eq (2)

2. Define $r = 4 \times \lfloor R/(4L) \rfloor + (R \bmod 4)$. Eq (3)

3. For k={0, 1, 2}
   a. Let $p_k = F_P^k(r_1)$, where $F_P^k()$ is a hop-port mapping function for tile segment k.
   b. Let $t_k = F_S^k(r_1)$, where $F_S^k()$ is an OFDM symbol mapping function for tile segment k.
   c. Let $h_k = (h+k) \bmod L$. Eq (4)
   d. The hop-port with index $p_k$ in the OFDM symbol with index $t_k$ in the FLCS tile with index $h_k$ is allocated to the FLCS resource with index R.

The above design has several desirable features, which are described in detail below.

For clarity, the following terms are used in the description herein. "Traversing" refers to going through a set of elements only once, e.g., from the first element to the last element in the set. "Cycling through" refers to going through a set of elements multiple times, e.g., from the first element to the last element in the set each time.

Figure 7:
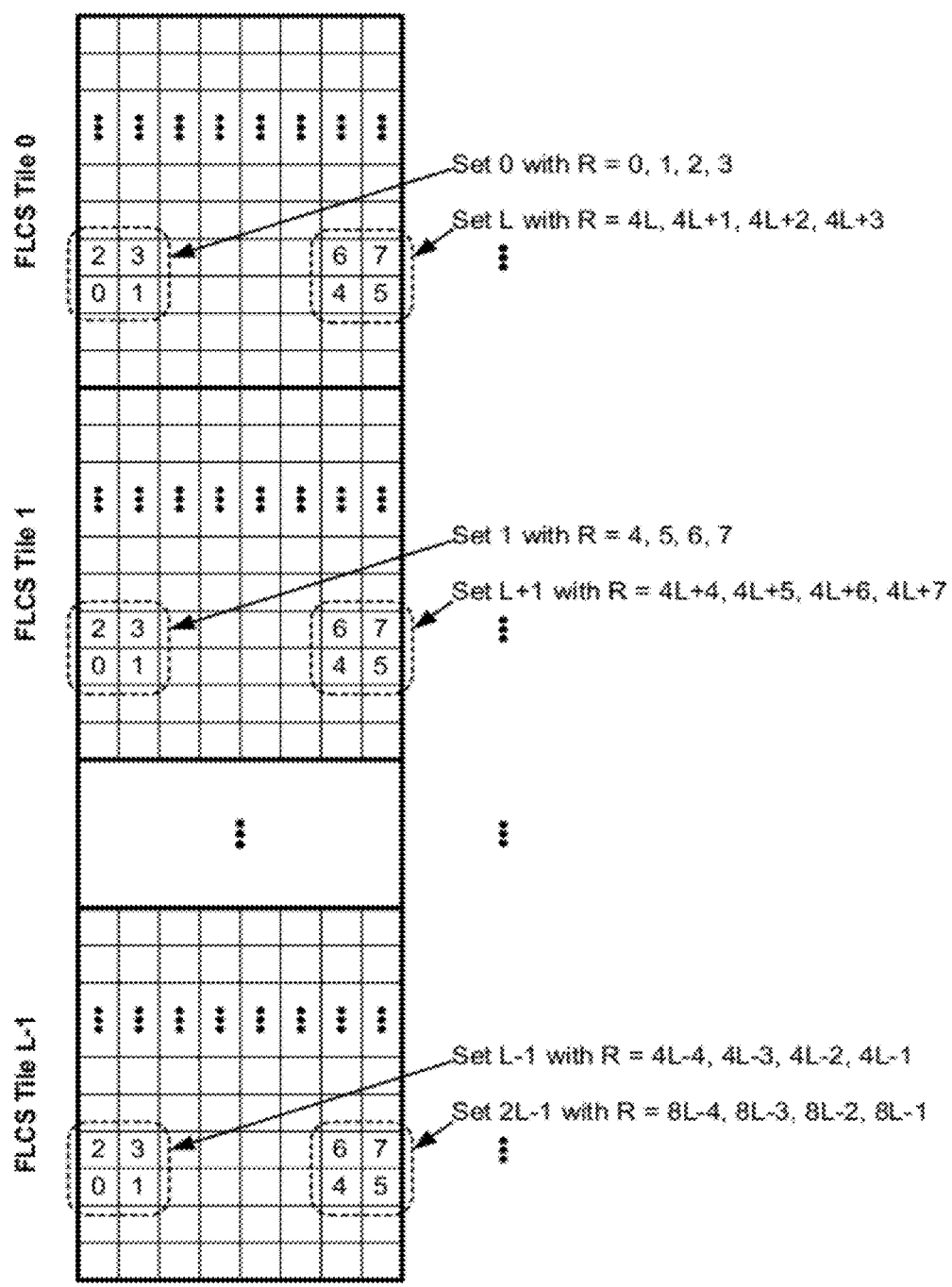
FIG. 7 shows localized mapping of FLCS resources.

FIG. 7 shows the mapping of FLCS resources to different starting FLCS tiles for the first FLCS resource mapping scheme. Equation (2) cycles through the $N_{FLCS}$ FLCS resources for the common segment and maps each set of four FLCS resources to a respective starting FLCS tile, begining with FLCS tile 0 and wrapping back to FLCS tile 0 after reaching FLCS tile L-1. For the first 4L FLCS resources, FLCS resources 0 through 3 are mapped to starting FLCS tile 0, FLCS resources 4 through 7 are mapped to starting FLCS tile 1, and so on, and FLCS resources 4L-4 through 4L-1 are mapped to starting FLCS tile L-1. For the next 4L FLCS resources, FLCS resources 4L through 4L+3 are mapped to starting FLCS tile 0, FLCS resources 4L+4 through 4L+7 are mapped to starting FLCS tile 1, and so on, and FLCS resources 8L-4 through 8L-1 are mapped to starting FLCS tile L-1. The mapping continues until all FLCS resources are mapped to appropriate starting FLCS tiles. The FLCS resources are mapped in sets of four to achieve localized mapping for each set of four FLCS resources (except for the last 6L FLCS resources, which are mapped to transmission units 32 through 35). The mapping in FIG. 7 is symmetric in that L consecutive sets of four FLCS resources are mapped to the same cluster of four transmission units in the L FLCS tiles, and then the next L consecutive sets of four FLCS resources are mapped to another cluster of four transmission units in the L FLCS tiles, etc.

FIG. 7 also shows the mapping of each set of four FLCS resources to transmission units for the first FLCS resource mapping scheme. For each FLCS tile, equation (3) maps the first set of four FLCS resources in the FLCS tile to transmission units 0 through 3, the second set of four FLCS resources to transmission units 4 through 7, and so on, and the last set of four FLCS resources to transmission units 32 through 35 (not shown in FIG. 7).

Each FLCS resource is mapped to three tile segments 0, 1 and 2 in up to three different FLCS tiles with indices $h_0$, $h_1$ and $h_2$, which are computed as shown in equation (4). $h_0$ is equal to the starting FLCS tile index h provided by equation (2). $h_1$ and $h_2$ are for the next two FLCS tiles, which may wrap around to 0 after reaching L-1 due to the mod L operation. $h_2$ may be equal to h if L=2, and $h_1$ and $h_2$ may be equal to h if L=1.

Each FLCS resource is mapped to three transmission units with the same index r in the three tile segments 0, 1 and 2. For each tile segment k, where k∈{0, 1, 2}, function $F_P^k()$ provides the hop-port $p_k$ for transmission unit r, and function $F_S^k()$ provides the OFDM symbol period $t_k$ for transmission unit r. Functions $F_P^0()$ and $F_S^0()$ for tile segment 0 may be determined by the left tile segment in FIG. 5, functions $F_P^1()$ and $F_S^1()$ for tile segment 1 may be determined by the middle tile segment, and functions $F_P^2()$ and $F_S^2()$ for tile segment 2 may be determined by the right tile segment. For the design described above, FLCS resource R is mapped to (i) transmission unit r at hop-port $p_0$ in OFDM symbol period to of tile segment 0 in FLCS tile $h_0$, (ii) transmission unit r at hop-port $p_1$ in OFDM symbol period $t_1$ of tile segment 1 in FLCS tile $h_1$, and (iii) transmission unit r at hop-port $p_2$ in OFDM symbol period $t_2$ of tile segment 2 in FLCS tile $h_2$.

In a second FLCS resource mapping scheme, the FLCS resources are mapped to transmission units in the common segment in a manner to achieve scalability, third order diversity, and avoidance of forbidden zone. The second FLCS resource mapping scheme may also be referred to as a Distributed Resource Channel (DRCH) mapping scheme.

Figure 8:
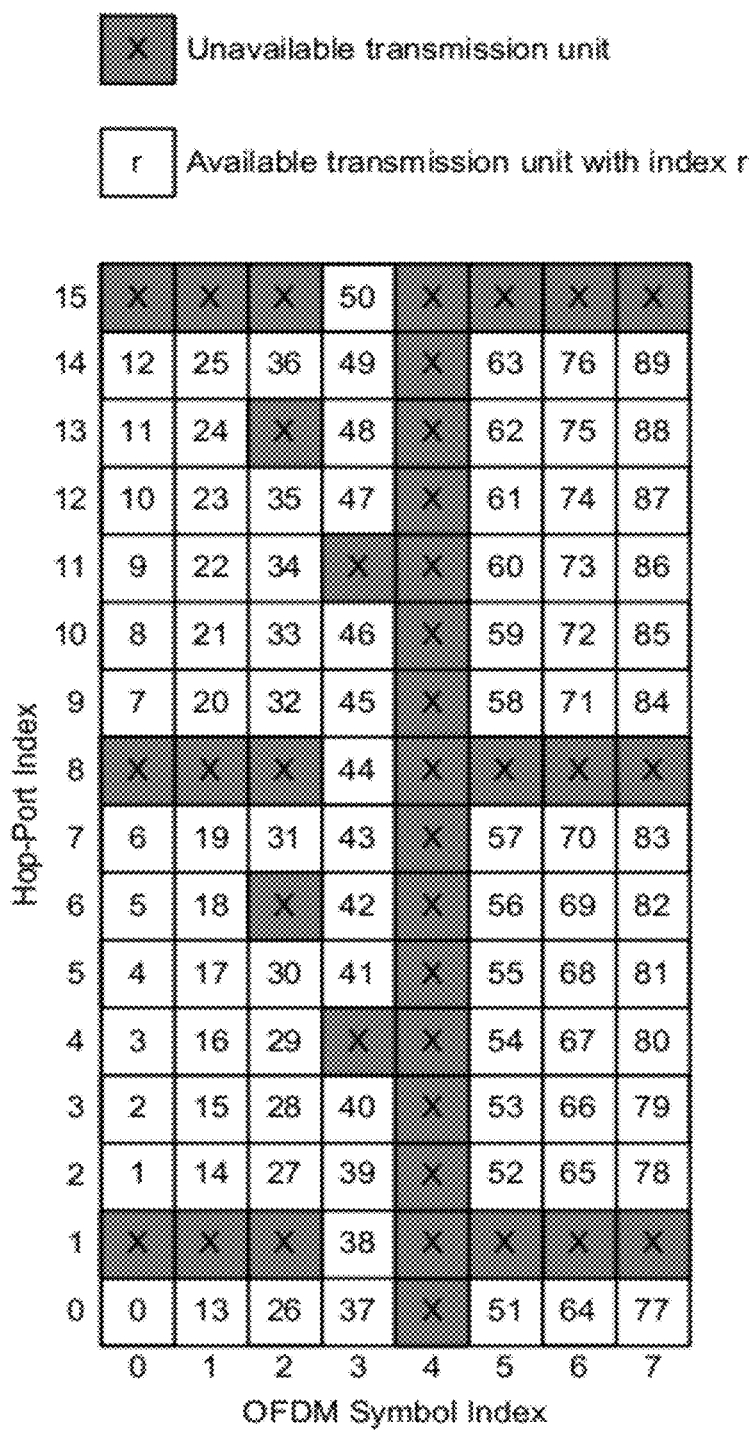
FIG. 8 shows an FLCS tile with available transmission units.

FIG. 8 shows a design of an FLCS tile that may be used for the second FLCS resource mapping scheme. In this design, transmission units within a forbidden zone and unavailable for use for the FLCS resources are marked with "X". The unavailable transmission units may be used for channels such as Forward Common Pilot Channels, Forward Beacon Pilot Channel, etc. The transmission units not in the forbidden zone are available for use for the FLCS resources. The number of available transmission units $N_{AVAIL}$ is dependent on the total number of transmission units in the FLCS tile and the number of unavailable transmission units. The available transmission units may be assigned unique indices starting with 0 for the transmission unit in the lower left corner of the FLCS tile and concluding with $N_{AVAIL}-1$ for the transmission unit in the upper right corner. In the example shown in FIG. 8, the FLCS tile includes 38 unavailable transmission units and 90 available transmission units with indices 0 through 89.

For the second FLCS resource mapping scheme, the total number of FLCS resources for the common segment may be given as:

$$N_{FLCS} = \lfloor N_{AVAIL}/3 \rfloor \times L. \quad \text{Eq (5)}$$

The $N_{FLCS}$ FLCS resources may be assigned indices of 0 through $N_{FLCS}-1$. The number of FLCS resources per FLCS tile, M, may be given as:

$$M = \lfloor N_{AVAIL}/3 \rfloor. \quad \text{Eq (6)}$$

Figure 9:
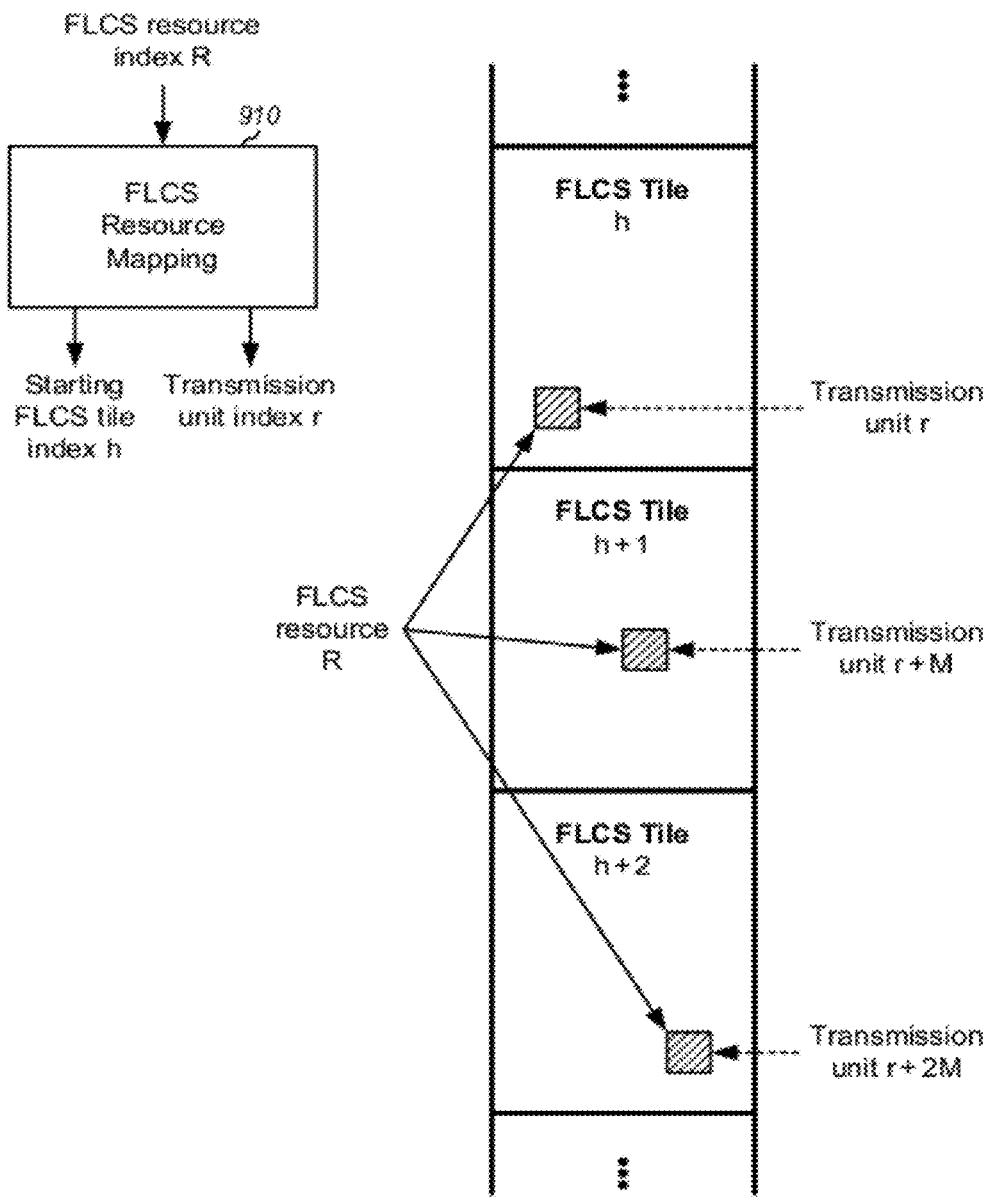
FIG. 9 shows another mapping of an FLCS resource to three transmission units.

FIG. 9 shows mapping of an FLCS resource to three transmission units to achieve third order diversity for the second FLCS resource mapping scheme. In this design, an FLCS resource with index R is mapped to three transmission units in up to three consecutive FLCS tiles. A mapping unit 910 may receive the index R of the FLCS resource and may determine (i) an index h of the first FLCS tile for the FLCS resource and (ii) an index r of the transmission unit in the first FLCS tile to which the FLCS resource is mapped. FLCS resource R may then be mapped to transmission unit r in FLCS tile h, transmission unit r+M in FLCS tile h+1, and transmission unit r+2M in FLCS tile h+2. For clarity, FIG. 9 shows three consecutive FLCS tiles being used for FLCS resource R. The three FLCS tiles may also wrap around as described below.

In the design shown in FIG. 9, third order diversity is achieved by mapping the FLCS resource to three different transmission units in three different FLCS tiles when L≥3. Third order diversity may also be achieved when one or two FLCS tiles are used for the common segment.

For the second FLCS resource mapping scheme, FLCS resource R may be mapped to three transmission units according to the following procedure.

1. Define $h = R \bmod L$. Eq (7)

2. Define $r = \lfloor R/L \rfloor$. Eq (8)

3. For k={0, 1, 2} a. Let $r_k = k \times \lfloor N_{AVAIL}/3 \rfloor + r$. Eq (9)

b. Let $h_k = (h+k) \bmod L$. Eq (10)

c. The transmission unit with index $r_k$ in the FLCS tile with index $h_k$ is allocated to the FLCS resource with index R.

Figure 10:
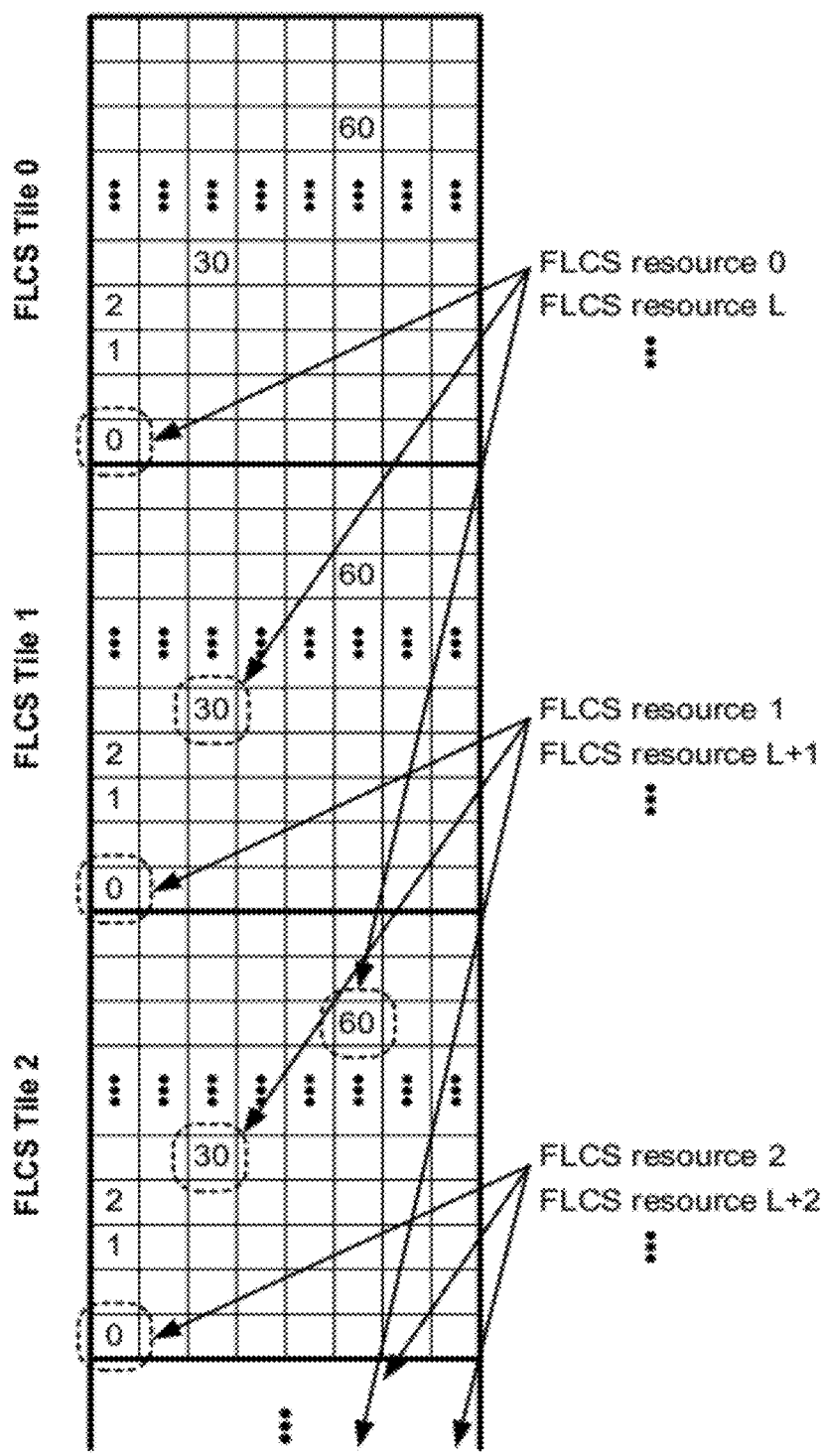
FIG. 10 shows distributed mapping of FLCS resources.

FIG. 10 shows the mapping of FLCS resources to different starting FLCS tiles for the second FLCS resource mapping scheme. Equation (7) cycles through the $NF_{FLCS}$ FLCS resources for the common segment and maps each FLCS resource to a respective starting FLCS tile, starting with FLCS tile 0 and wrapping back to FLCS tile 0 after reaching FLCS tile L−1. For the first L FLCS resources, FLCS resources 0 through L−1 are mapped to starting FLCS tiles 0 through L−1, respectively. For the next L FLCS resources, FLCS resources L through 2L−1 are mapped to starting FLCS tiles 0 through L−1, respectively. The mapping continues until all FLCS resources are mapped to appropriate starting FLCS tiles. The mapping in FIG. 10 is symmetric in that L consecutive FLCS resources are mapped to the same transmission unit in the L FLCS tiles, and then the next L consecutive FLCS resources are mapped to another transmission unit in the L FLCS tiles, etc.

FIG. 10 also shows the mapping of each FLCS resource to transmission units for the second FLCS resource mapping scheme. For each FLCS tile, equation (8) maps the first FLCS resource in the FLCS tile to transmission unit 0, the second FLCS resource to transmission unit 1, and so on.

Each FLCS resource may be mapped to three different transmission units with indices $r_0$, $r_1$ and $r_2$ in up to three different FLCS tiles with indices $h_0$, $h_1$ and $h_2$, respectively, which are computed as shown in equations (9) and (10). $h_0$ is equal to the starting FLCS tile index h provided by equation (7). $h_1$ and $h_2$ are for the next two FLCS tiles, which may wrap around to 0 after reaching L−1 due to the mod L operation. $r_0$ is equal to the transmission unit index r provided by equation (8). $h_2$ may be equal to h if L=2, and $h_1$ and $h_2$ may be equal to h if L=1. $r_1$ is equal to r+M, and $r_2$ is equal to r+2M. FLCS resource R is mapped to transmission unit $r_0$ in FLCS tile $h_0$, transmission unit $r_1$ in FLCS tile $h_1$, and transmission unit $r_2$ in FLCS tile $h_2$.

For the second FLCS resource mapping scheme, transmission units 0 through M−1 may be considered as belonging to tile segment 0, transmission units M through 2M−1 may be considered as belonging to tile segment 1, and transmission units 2M through 3M−1 may be considered as belonging to tile segment 3. Each tile segment may include M transmission units. The second FLCS resource mapping scheme may be similar to the first FLCS resource mapping scheme, albeit with different $F_H^k()$ and $F_S^k()$ mapping functions for the three tile segments.

The system may support only the first FLCS resource mapping scheme, only the second FLCS resource mapping scheme, or both mapping schemes. If both mapping schemes are supported, then either the first or second FLCS resource mapping scheme may be selected for use. For example, a parameter UseDRCHForFLCS may be set to 0 to select the first FLCS resource mapping scheme or to 1 to select the second FLCS resource mapping scheme.

Two FLCS resource mapping schemes have been described above for the common segment. The FLCS resources may also be mapped to the available transmission units in the L FLCS tiles for the common segment in other manners based on other FLCS resource mapping schemes.

The control channels in Table 1 may be sent on the common segment in various manners. The number of FLCS resources to assign to each control channel may be dependent on the amount of control information to send on that control channel as well as the manner in which the control information is sent. In one design, the first seven control channels in Table 1 are sequentially assigned FLCS resources. Table 2 shows a design for sequentially assigning FLCS resources to the seven control channels.

TABLE 2

| Channel | # of FLCS resources to assign to channel | FLCS resources to use for channel | Definition |
| --- | --- | --- | --- |
| F-ACKCH | $N_1 = 4 \times \lceil N_a/4 \rceil$ | 0 to $N_1 - 1$ | |
| F-SPCH | $N_2 = 4 \times \lceil N_b/4 \rceil$ | $N_1$ to $N_{12} - 1$ | $N_{12} = N_1 + N_2$ |
| F-RABCH | $N_3 = 2 \times N_c$ | $N_{12}$ to $N_{13} - 1$ | $N_{13} = N_{12} + N_3$ |
| F-PQICH | $N_4 = 2 \times N_d$ | $N_{13}$ to $N_{14} - 1$ | $N_{14} = N_{13} + N_4$ |

TABLE 2-continued

| Channel | # of FLCS resources to assign to channel | FLCS resources to use for channel | Definition |
|---|---|---|---|
| F-FOSICH | $N_5 = 2 \times N_e$ | $N_{14}$ to $N_{15} - 1$ | $N_{15} = N_{14} + N_5$ |
| F-IOTCH | $N_6 = 2 \times N_f$ | $N_{15}$ to $N_{16} - 1$ | $N_{16} = N_{15} + N_6$ |
| F-PCCH | $N_7 = \lceil N_g/3 \rceil$ | $N_{16}$ to $N_{17} - 1$ | $N_{17} = N_{16} + N_7$ |

In one design, $N_a$ ACK values may be sent on the F-ACKCH, where $N_a \geq 0$, and up to four ACK values may be sent in a set of four FLCS resources. A sequence of 12 symbols may be generated for each ACK value and denoted as $\{Z_{00}, Z_{01}, Z_{02}, Z_{10}, Z_{11}, Z_{12}, Z_{20}, Z_{21}, Z_{22}, Z_{30}, Z_{31}, Z_{32}\}$, where $Z_{ij}$ is the symbol to be sent on FLCS resource i in the j-th FLCS tile. The symbol sequence may be generated based on the ACK value, a sector identifier (ID) for a sector sending the ACK value, and a Medium Access Control (MAC) ID of a recipient terminal. Four 4-chip orthogonal sequences (e.g., four columns of a 4×4 DFT matrix) may be used for four ACK values that may be sent simultaneously on the same set of FLCS resources. The symbol sequence for each ACK value may be generated based on the orthogonal sequence for that ACK value. For each ACK value, each set of four symbols $Z_{0j}$, $Z_{1j}$, $Z_{2j}$ and $Z_{ij}$ may be generated based on the orthogonal sequence for that ACK value and sent on four adjacent transmission units in one FLCS tile j.

In one design, $N_b$ start of packet (SP) values may be sent on the F-SPCH, where $N_b \geq 0$, and up to four SP values may be sent in a set of four FLCS resources. A sequence of 12 symbols may be generated for each SP value based on that SP value and the sector ID, e.g., in similar manner as the ACK values. Four 4-chip orthogonal sequences may be used for up to four SP values that may be sent simultaneously on the same set of four FLCS resources.

In one design, $N_c$ reverse activity bit (RAB) values may be sent on the F-RABCH, where $N_c \geq 0$, and each RAB value may be sent in two FLCS resources. A sequence of 6 symbols $\{c_0, c_1, c_2, c_3, c_4, c_5\}$ may be generated for each RAB value based on that RAB value and the sector ID. The symbol sequence may be sent on six transmission units for two FLCS resources.

In one design, $N_d$ PQI reports may be sent on the F-PQICH, where $N_d \geq 0$ and each PQI report may be sent in two FLCS resources. A PQI report may include a 4-bit PQI value and may be encoded and mapped to a sequence of 6 symbols $\{c_0, c_1, c_2, c_3, c_4, c_5\}$ based on that PQI value, the sector ID, and the MAC ID of the recipient terminal. The symbol sequence for each PQI report may be sent on six transmission units for two FLCS resources.

In one design, $N_e$ fast OSI reports may be sent on the F-FOSICH, where $N_e \geq 0$, and each fast OSI report may be sent in two FLCS resources. A fast OSI report may include a 4-bit fast OSI value and may be encoded and mapped to a sequence of 6 symbols $\{c_0, c_1, c_2, c_3, c_4, C_5\}$ based on that fast OSI value and the sector ID. The symbol sequence for each fast OSI report may be sent on six transmission units for two FLCS resources. To reduce transmit power, a fast OS value of '0000', which is most likely to be sent, may be mapped to a sequence of symbols with zero value.

In one design, $N_f$ interference-over-thermal (IOT) reports may be sent on the F-FIOTCH, where $N_f \geq 0$, and each IOT report may be sent in two FLCS resources. An IOT report may include a 4-bit IOT value and may be encoded and mapped to a sequence of 6 symbols $\{c_0, c_1, c_2, c_3, C_4, c_5\}$ based on that IOT value and the sector ID. The symbol sequence for each IOT report may be sent on six transmission units for two FLCS resources.

In one design, $N_g$ power control (PC) bits may be sent on the F-PCCH, where $N_g \geq 0$, and up to three PC bits may be sent on one FLCS resource. A symbol may be generated for each PC bit based on that PC bit and the sector ID. Up to three symbols for up to three PC bits may be sent on three transmission units for one FLCS resource.

Table 2 shows a specific design for assigning FLCS resources to the control channels. In this design, control channels that benefit from localized mapping, such as the F-ACKCH and F-SPCH, are allocated FLCS resources first. These FLCS resources are mapped to adjacent transmission units. Control channels that do not benefit from localized mapping, such as the F-PCCH, are allocated FLCS resources last. These FLCS resources may be mapped to transmission units 32 through 35 located throughout the FLCS tiles. The FLCS resources may also be assigned to the control channels in other manners.

The F-SCCH may be sent on the common segment or the K LAB segments in various manners. In one design, the F-SCCH may be sent on the common segment if either (i) the first FLCS resource mapping scheme is used and no LAB segments are present or (ii) the second FLCS resource mapping scheme is used.

In one design, the F-SCCH may carry a variable number of packets. Each packet may be encoded and mapped to $N_{SYM}$ symbols with QPSK or to $N_{SYM}/2$ symbols with 16-QAM. Thus, one packet may be sent in $N_{SYM}$ transmission units with QPSK, and two packets may be sent in Nsu transmission units with 16-QAM. P packet-pairs may be sent on the F-SCCH, where P may be dependent on the number of symbols per packet-pair and the number of transmission units available for the F-SCCH. Each packet-pair may include either one packet sent with QPSK and having an index (a, 0) or two packets sent with 16-QAM and having indices (a, 0) and (a, 1), where $a \in (0, \ldots, P-1$ is an index for packet-pair, and 0 and 1 denote packets 0 and 1 (if applicable) for the packet-pair.

In a first F-SCCH mapping scheme, the P packet-pairs may be mapped to transmission units in the L FLCS tiles of the common segment according to the foil owing procedure.

1. Initialize the hop-port counter i, block counter k, OFDM symbol counter j to 0.
2. Initialize modulation symbol index p(n)=0, for n=0, 1, 2, ..., P−1.
3. If hop-port counter i is a usable hop-port for the F-SCCH, a. Define $a = (k+j \pm i) \bmod P$.      Eq (11)

b. Define b=0 if packet with index (a, 0) is sent using QPSK.

Define $b = p(a) \bmod 2$ otherwise.      Eq (12)

c. Populate modulation symbol with index p(a) from the packet with index (a, 0) on the i-th hop-port of the j-th OFDM symbol in the k-th FLCS tile of the common segment if this packet is sent using QPSK.

d. Populate modulation symbol with index $\lfloor p(a)/2 \rfloor$ from the packet with index (a, b) on the i-th hop-port of the j-th OFDM symbol in the k-th FLCS tile of the common segment if this packet is sent using 16-QAM.

e. Increment p(a) by 1.

4. Increment i by 1. If i=16, set k=k+1 and set i=0.
5. If k≥L, set k=0 and increment j by 1.
6. If j≥8, exit. Otherwise go to step 3.

For the first F-SCCH mapping scheme, the procedure starts at OFDM symbol period 0, traverses through all 16 hop-ports for each of the L, FLCS tiles, and maps one packet-pair to each transmission unit. The packet-pair mapped to the transmission unit in hop-port i of OFDM symbol period j in FLCS tile k is determined by equation (11). Equation (11) cycles through the P packet-pairs as hop-port index i is incremented.

A counter p(a) is maintained for each packet-pair and indicates the next symbol to send in the next transmission unit available for that packet-pair. Counter p(a) for each packet-pair is initialized to 0. Thereafter, whenever packet-pair a is mapped to an available transmission unit and QPSK is used, then symbol p(a) of packet a1. is mapped to this transmission unit, and index p(a) is incremented. If 16-QAM is used, then symbols from two packets in the packet-pair are alternately mapped to the available transmission units for this packet-pair, e.g., a symbol from packet (a, 0) is mapped to an available transmission unit for packet-pair a, then a symbol from packet (a, 1) is mapped to the next available transmission unit for packet-pair a, etc.

After traversing through all transmission units/hop-ports in one OFDM symbol period, the procedure traverses through all transmission units in the next OFDM symbol period and repeats the mapping. By traversing through all transmission units in all L FLCS tiles of the common segment, each available transmission unit may be identified and used for the F-SCCH.

Figure 11:
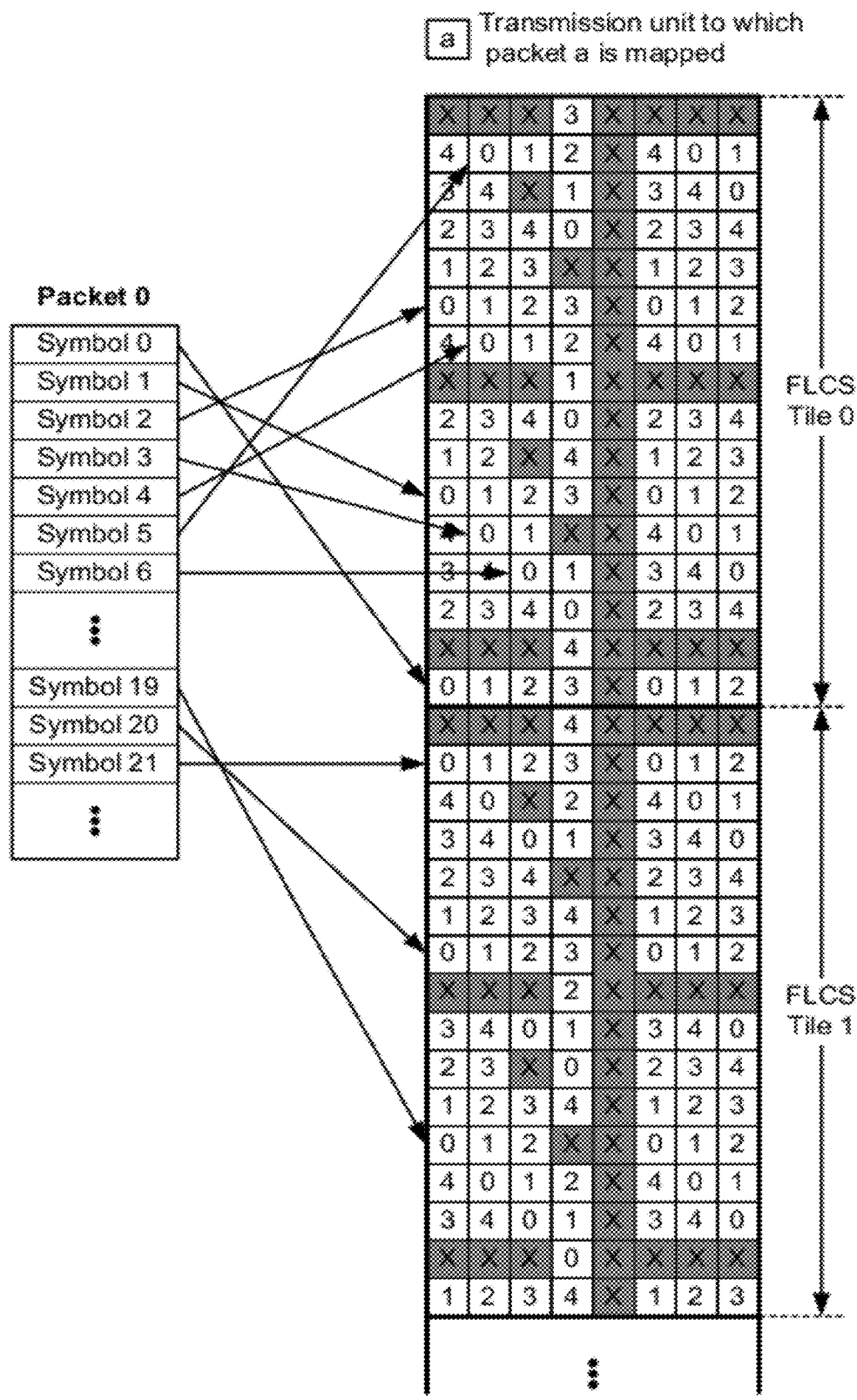
FIG. 11 shows mapping of a packet to transmission units.

FIG. 11 shows an example mapping of five packet-pairs for the F-SCCH to transmission units in the common segment based on the first F-SCCH mapping scheme. For simplicity, each packet-pair includes one packet sent using QPSK. For each FLCS tile in the common segment, the packet mapped to each transmission unit in that FLCS tile is labeled in FIG. 11. The transmission units not available for the F-SCCH are shown with grey shading and marked with "X". The transmission units available for the F-SCCH are shown without shading, and each transmission unit is marked with the index of the packet mapped to that transmission unit. For simplicity, FIG. 11 assumes that only the F-SCCJH is sent on the common segment. If other control channels are sent, then transmission units used for these other control channels are unavailable and marked with "X".

For simplicity, FIG. 11 shows only one packet with index 0 among the five packets sent on the F-SCCH in this example. Symbols for packet 0 may be sent in each available transmission unit to which packet 0 is mapped. FIG. 11 shows the mapping of some symbols for packet 0 to some available transmission units to which packet 0 is mapped. The symbols for packet 0 are mapped in sequential order to the available transmission units for the packet, as described above. However, the mapping appears random in FIG. 11 because the symbols and FLCS tiles are sequentially numbered from top to bottom whereas the hop-ports are sequentially numbered from bottom to top. The symbols for each remaining packet may be mapped to available transmission units in similar manner.

The F-SCCH may also be sent in the K LAB segments. In one design, P packet-pairs for the F-SCCH may be sent in each LAB segment comprising 3 FLCS tiles, where P may be dependent on the number of symbols per packet-pair and the number of available transmission units per LAB segment. A total of P·K packet-pairs with indices of 0 through P·K−1 may be sent in the K LAB segments. Each packet-pair may include either one packet sent with QPSK and having an index (a, 0) or two packets sent with 16-QAM and having indices (a, 0) and (a, 1), where a∈{0, ..., P·K−1} is an index for packet-pair, and 0 and 1 denote packets 0 and 1 (if applicable) for the packet-pair.

In a second F-SCCH mapping scheme, P packet-pairs with indices of q·P to (q+1)·P−1 may be mapped to transmission units in the three FLCS tiles of LAB segment q, for q∈{0, ..., K−1}, according to the following procedure.

1. Initialize the hop-port counter i, block counter k, OFDM symbol counter j to 0.
2. Initialize modulation symbol index p(n)=0, for n=q·P, ..., (q+1)·P−1.
3. If hop-port counter i is a usable hop-port for the F-SCCH, a. Define $a=[(k+j+i) \bmod P]+q \cdot P$.    Eq (13)

b. Define b=0 if packet with index (a, 0) is sent using QPSK.

Define $b=p(a) \bmod 2$ otherwise.    Eq (14)

c. Populate modulation symbol with index p(a) from the packet with index (a, 0) on the i-th hop-port of the j-th OFDM symbol in the k-th FLCS tile of LAB segment q if this packet is sent using QPSK.

d. Populate modulation symbol with index $\lfloor p(a)/2 \rfloor$ from the packet with index (a, b) on the i-th hop-port of the j-th OFDM symbol in the k-th FLCS tile of LAB segment q if this packet is sent using 16-QAM.

e. Increment p(a) by 1.

4. Increment i by 1. If i=16, set k=k+1 and set i=0.
5. If k≥3, set k=0 and increment j by 1.
6. If j≥8, exit. Otherwise go to step 3.

The second F-SCCH mapping scheme is similar to the first F-SCCH mapping scheme with the following differences. First, the P packet-pairs for LAB segment q are mapped to three FLCS tiles for LAB segment q in the second scheme whereas the P packet-pairs for the F-SCCH are mapped to L FLCS tiles for the common segment in the first scheme. Second, the available transmission units in the three FLCS tiles for LAB segment q for the second scheme may be different from the available transmission units in the L FLCS tiles for the common segment in the first scheme. Third, index a keeps track of the P packets sent in each LAB segment for the second scheme and keeps track of the P packets for the F-SCCH in the first scheme. For both schemes, the P packet-pairs are cycled through and mapped to different transmission units by traversing through these transmission units in a predetermined order. These two schemes distribute the symbols for each packet approximately uniformly across each FLCS tile used for the packet.

Two F-SCCH mapping schemes have been described above for the F-SCCH. The packets for the F-SCCH may also be mapped to the available transmission units based on other mapping schemes. In another F-SCCH mapping scheme, the available transmission units may be determined initially, and the P packet-pairs may be sequentially mapped to these available transmission units. In this scheme, a single counter p(a) may be maintained for all P packet-pairs.

FIG. 12 shows a design of a process 1200 for communicating control information. Process 1200 may be performed by a base station and/or a terminal. A tile index h and a transmission unit index r for a control resource index R may be determined (block 1212). A control resource (e.g., an FLCS resource) with index R may be mapped to a transmission unit with index r in a tile with index h (block 1214). The control resource may be one of a plurality of control resources for a control segment comprising L tiles, where L≥1. Each tile may comprise a plurality of transmission units. Block 1212 may be performed based on a mapping scheme that distributes the plurality of control resources across the L tiles for any number of tiles. The mapping scheme may be the one shown in equations (2) and (3), the one shown in equations (7) and (8), or some other mapping scheme. Control information may be sent or received via the control resource (block 1216).

In one design of symmetric mapping, multiple sets of S control resources may be formed for the plurality of control resources, where S≥1. Each batch of L consecutive sets of S control resources may be mapped to S transmission units at the same location in the L tiles. Different batches of L consecutive sets of S control resources may be mapped to different locations of the L tiles.

In one design of localized mapping, multiple sets of S control resources may be formed for the plurality of control resources, where S>1. Each set of S control resources may be mapped to a cluster of S adjacent transmission units in each of at least one tile. The multiple sets of S control resources may be traversed, and each set of S control resources may be mapped to at least one tile determined by cycling through the L tiles. In one design, S=4, and each set of four control resources may be mapped to a cluster of four adjacent transmission units in each of at least one tile, e.g., as shown in FIG. 7 and equations (2) and (3). In one design of distributed mapping, the plurality of control resources may be traversed, and each control resource may be mapped to at least one tile determined by cycling through the L tiles, e.g., as shown in FIG. 10 and equations (7) and (8).

The control resource with index R may be mapped to multiple (e.g., three) transmission units in at least one tile among the L tiles to obtain diversity for the control resource. The multiple transmission units may be in different locations of the at least one tile. The indices of the multiple transmission units may be determined based on the transmission unit index r.

In one design of diversity, each tile may be associated with multiple tile segments, and each tile segment may include a different subset of the plurality of transmission units in the tile. The transmission units in each tile segment may have pre-assigned indices, e.g., as shown in FIG. 5. The control resource with index R may be mapped to one transmission unit with index r in each of the multiple tile segments for at least one tile, e.g., as shown in FIG. 6.

In another design of diversity, transmission units available for use in each tile may be assigned unique indices. The control resource with index R may be mapped to multiple transmission units with different indices in at least one tile. The indices of the multiple transmission units may be determined based on the transmission unit index r and may be spaced apart by M, e.g., as shown in FIG. 9. M may be determined based on the number of transmission units available for use in each tile and the number of transmission units to which the control resource is mapped.

The plurality of control resources may be assigned to a plurality of control channels, one control channel at a time and in a predetermined order. A control channel relying on localized mapping may be assigned control resources first, and a control channel not relying on localized mapping may be assigned control resources later.

FIG. 13 shows a design of an apparatus 1300 for communicating control information. Apparatus 1300 includes means for determining a tile index h and a transmission unit index r for a control resource index R (module 1312), means for mapping a control resource with index R to a transmission unit with index r in a tile with index h (module 1314), and means for sending or receiving control information via the control resource (module 1316).

FIG. 14 shows a design of a process 1400 for exchanging control information. Process 1400 may be performed by a base station and/or a terminal. Transmission units available for a control channel (e.g., the F-SCCH) may be determined from among all transmission units for a control segment (e.g., a common segment or a LAB segment) in which the control channel is sent and may exclude transmission units unavailable for the control channel (block 1412). The unavailable transmission units may include transmission units used for pilot, other control channels, other transmissions, etc.

A set of transmission units for a packet may be determined from among the transmission units available for the control channel and may be distributed across these available transmission units (block 1414). The control segment may include at least one tile, and each tile may include a plurality of transmission units. In one design, the plurality of transmission units in each tile may be traversed, and each transmission unit may be assigned to one packet among multiple packets by cycling through the multiple packets, e.g., as shown in FIG. 11. All transmission units in the at least one tile to which the packet is mapped may be determined. The set of transmission units for the packet may then be determined from among these transmission units but may exclude the transmission units unavailable for the control channel. The packet may be sent or received via the set of transmission units (block 1416).

FIG. 15 shows a design of an apparatus 1500 for exchanging control information. Apparatus 1500 includes means for determining transmission units available for a control channel from among all transmission units for a control segment in which the control channel is sent and excluding transmission units unavailable for the control channel (module 1512), means for determining a set of transmission units for a packet from among the transmission units available for the control channel (module 1514), and means for sending or receiving the packet via the set of transmission units (module 1516).

The modules in FIGS. 13 and 15 may comprise processors, electronics devices, hardware devices, electronics components, logical circuits, memories, etc., or any combination thereof.

Figure 16:
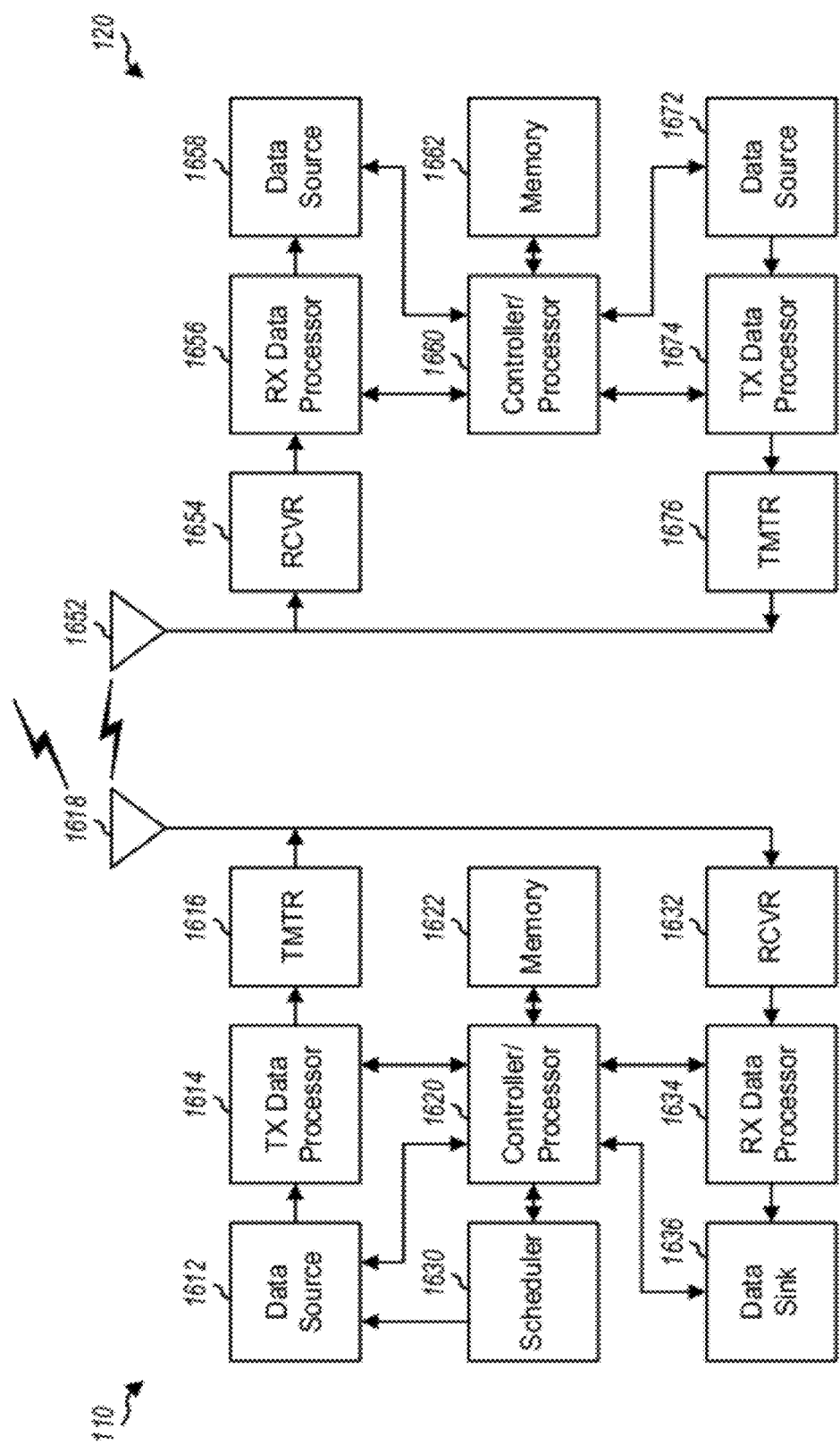
FIG. 16 shows a block diagram of a base station and a terminal.

FIG. 16 shows a block diagram of a design of a base station 110 and a terminal 120, which are one of the base stations and one of the terminals in system 100 in FIG. 1. At base station 110, a transmit (TX) data processor 1614 may receive traffic data from a data source 1612 for terminals scheduled for transmission on the forward link and control information for different control channels from a controller/processor 1620. For example, controller/processor 1620 may provide control information for the control channels in Table 1. A scheduler 1630 may provide assignments of resources for the scheduled terminals, and these assignments may be sent in the control information. TX data processor 1614 may process (e.g., encode and symbol map) the data and control information, perform modulation (e.g., for OFDM), and provide output chips. A transmitter (TMTR) 1616 may condition (e.g., convert to analog, filter, amplify, and upconvert) the output chips and generate a forward link signal, which may be transmitted via an antenna 1618.

At terminal 120, an antenna 1652 may receive the forward link signal from base station 110 and provide a received signal to a receiver (RCVR) 1654. Receiver 1654 may condition and digitize the received signal and provide samples. A received (RX) data processor 1656 may perform demodulation on the samples (e.g., for OFDM) and demodulate and decode the resultant symbols to obtain decoded data and control information. Processor 1656 may provide the decoded data to a data sink 1658 and the decoded control information to a controller/processor 1660.

On the reverse link, a TX data processor 1674 at terminal 120 may receive traffic data from a data source 1672 and control information from controller/processor 1660. The data and control information may be processed (e.g., encoded, symbol mapped, and modulated) by TX data processor 1674 and further conditioned by a transmitter 1676 to generate a reverse link signal, which may be transmitted via antenna 1652. At base station 110, the reverse link signals from terminal 120 and other terminals may be received by antenna 1618, conditioned by a receiver 1632, and demodulated and decoded by an RX data processor 1634.

Controllers/processors 1620 and 1660 may direct the operation at base station 110 and terminal 120, respectively. Controller/processor 1620 may direct transmission of data and control information on the forward link and may determine the control resources to use for each control channel. Controller/processor 1620 and/or 1660 may perform process 1200 in FIG. 12, process 1400 in FIG. 14, and/or other processes for the techniques described herein. Memories 1622 and 1662 may store program code and data for base station 110 and terminal 120, respectively.

The techniques described herein may be implemented by various means. For example, these techniques may be implemented in hardware, firmware, software, or a combination thereof. For a hardware implementation, the processing units used to perform the techniques at an entity (e.g., a base station or a terminal) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 1622 or 1662 in FIG. 16) and executed by a processor (e.g., processor 1620 or 1660). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
   a processor; and
   a memory coupled to the processor, wherein the memory stores instructions executable by the processor to perform operations comprising:
   determining available transmission units for use by a control channel from among transmission units associated with a control segment during which the control channel is sent, wherein the control segment includes a plurality of tiles;
   forming L sets of S control resources of a plurality of control resources, wherein L is a first positive integer equal to one or greater, and wherein S is a second positive integer, wherein the plurality of control resources includes a first control resource and a second control resource;
   determining a set of transmission units from among the available transmission units, wherein each transmission unit in the set of transmission units corresponds to a distinct hop-port, wherein the set of transmission units includes a first transmission unit and a second transmission unit;
   mapping, during the control segment, each set of the L sets of S control resources to the set of transmission units across the plurality of tiles based on a transmission unit index h, wherein the transmission unit index h is computed based on a control resource index R;
   allocating the first control resource to a first control channel by mapping, according to a localized mapping scheme, the first control resource to the first transmission unit; and
   allocating the second control resource to a second control channel by mapping according to a mapping scheme other than the localized mapping scheme, the second control resource to the second transmission unit, wherein the first control resource is allocated to the first control channel prior to the second control resource being allocated to the second control channel.

2. The apparatus of claim 1, wherein the set of transmission units is distributed across the available transmission units.

3. The apparatus of claim 1, wherein the available transmission units are determined by excluding particular transmission units used for other transmissions.

4. The apparatus of claim 1, wherein each of the plurality of tiles comprises a plurality of available transmission units.

5. The apparatus of claim 4, wherein at least one tile of the plurality of tiles has a repeating pattern of unavailable transmission units.

6. The apparatus of claim 5, wherein the operations further comprise:
   assigning each of the plurality of available transmission units to one packet among multiple packets of the control channel, the one packet being determined by cycling through the multiple packets.

7. The apparatus of claim 1, wherein the set of transmission units is distributed across a subset of the plurality of tiles.

8. The apparatus of claim 1, wherein the control segment comprises three tiles, and wherein the set of transmission units is distributed across the three tiles.

9. A method for wireless communication, comprising:
   determining available transmission units for use by a control channel from among transmission units associated with a control segment during which the control channel is sent, wherein the control segment includes a plurality of tiles;

forming L sets of S control resources of a plurality of control resources, wherein L is a first positive integer, and wherein S is a second positive integer, wherein the plurality of control resources includes a first control resource and a second control resource;

determining a set of transmission units from among the available transmission units, wherein each transmission unit in the set of transmission units corresponds to a distinct hop-port, wherein the set of transmission units includes a first transmission unit and a second transmission unit;

mapping, during the control segment, each set of the L sets of S control resources to the set of transmission units across the plurality of tiles based on a transmission unit index h, wherein the transmission unit index h is computed based on a control resource index R;

allocating the first control resource to a first control channel by mapping, according to a localized mapping scheme, the first control resource to the first transmission unit; and allocating the second control resource to a second control channel by mapping according to a mapping scheme other than the localized mapping scheme, the second control resource to the second transmission unit, wherein the first control resource is allocated to the first control channel prior to the second control resource being allocated to the second control channel.

10. The method of claim 9, wherein each tile of the plurality of tiles comprises a plurality of available transmission units, and wherein the method further comprises:

assigning each of the plurality of available transmission units to one packet among multiple packets of the control channel, the one packet being determined by cycling through the multiple packets.

11. The method of claim 9, wherein the set of transmission units is distributed across the available transmission units.

12. An apparatus for wireless communication, comprising:

means for determining available transmission units for use by a control channel from among transmission units associated with a control segment during which the control channel is sent, wherein the control segment includes a plurality of tiles;

means for forming L sets of S control resources of a plurality of control resources, wherein L is a first positive integer, and wherein S is a second positive integer, wherein the plurality of control resources includes a first control resource and a second control resource;

means for determining a set of transmission units from among the available transmission units, wherein each transmission unit in the set of transmission units corresponds to a distinct hop-port, wherein the set of transmission units includes a first transmission unit and a second transmission unit;

means for mapping, during the control segment, each set of the L sets of S control resources to the set of transmission units across the plurality of tiles based on a transmission unit index h, wherein the transmission unit index h is computed based on a control resource index R, wherein the means for forming the L sets of S control resources is configured to:

allocate the first control resource to a first control channel by mapping, according to a localized mapping scheme, the first control resource to the first transmission unit; and allocate the second control resource to a second control channel by mapping, according to a mapping scheme other than the localized mapping scheme, the second control resource to the second transmission unit, wherein the first control resource is allocated to the first control channel prior to the second control resource being allocated to the second control channel.

13. The apparatus of claim 12, wherein each tile of the plurality of tiles comprises a plurality of available transmission units, and wherein the apparatus further comprises:

means for assigning each of the plurality of available transmission units to one packet among multiple packets of the control channel, the one packet being determined by cycling through the multiple packets.

14. The apparatus of claim 12, wherein the set of transmission units is distributed across the available transmission units.

15. A non-transitory computer-readable storage device storing instructions executable by a processor to perform operations comprising:

determining available transmission units for use by a control channel from among transmission units associated with a control segment during which the control channel is sent, wherein the control segment includes a plurality of tiles;

forming L sets of S control resources of a plurality of control resources, wherein L is a first positive integer, and wherein S is a second positive integer, wherein the plurality of control resources includes a first control resource and a second control resource;

determining a set of transmission units from among the available transmission units, wherein each transmission unit in the set of transmission units corresponds to a distinct hop-port, wherein the set of transmission units includes a first transmission unit and a second transmission unit;

mapping, during the control segment, each set of the L sets of S control resources to the set of transmission units across the plurality of tiles based on a transmission unit index h, wherein the transmission unit index h is computed based on a control resource index R;

allocating the first control resource to a first control channel by mapping, according to a localized mapping scheme, the first control resource to the first transmission unit; and allocating the second control resource to a second control channel by mapping according to a mapping scheme other than the localized mapping scheme, the second control resource to the second transmission unit, wherein the first control resource is allocated to the first control channel prior to the second control resource being allocated to the second control channel.

16. The non-transitory computer-readable storage device of claim 15, wherein each tile of the plurality of tiles comprises a plurality of available transmission units, and wherein the operations further comprise:

assigning each transmission unit of the plurality of available transmission units to one packet among multiple packets of the control channel, the one packet being determined by cycling through the multiple packets.

17. The non-transitory computer-readable storage device of claim 15, wherein the set of transmission units is distributed across the available transmission units.

18. The non-transitory computer-readable storage device of claim 15, wherein the available transmission units are determined by excluding particular transmission units used for other transmissions.

19. The non-transitory computer-readable storage device of claim 15, wherein each of the plurality of tiles comprises a plurality of available transmission units.

20. The non-transitory computer-readable storage device of claim 15, wherein at least one tile of the plurality of tiles has a repeating pattern of unavailable transmission units.

* * * * *